(12) United States Patent
Bishop et al.

(10) Patent No.: US 9,965,330 B2
(45) Date of Patent: May 8, 2018

(54) MAINTAINING THROUGHPUT OF A STREAM PROCESSING FRAMEWORK WHILE INCREASING PROCESSING LOAD

(71) Applicant: salesforce.com, inc., San Francisco, CA (US)

(72) Inventors: Elden Gregory Bishop, San Francisco, CA (US); Jeffrey Chao, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 38 days.

(21) Appl. No.: 14/986,401

(22) Filed: Dec. 31, 2015

(65) Prior Publication Data

US 2017/0083368 A1    Mar. 23, 2017

Related U.S. Application Data

(60) Provisional application No. 62/220,827, filed on Sep. 18, 2015.

(51) Int. Cl.
| | |
|---|---|
| *G06F 9/46* | (2006.01) |
| *G06F 9/50* | (2006.01) |
| *G06F 3/06* | (2006.01) |

(52) U.S. Cl.
CPC .............. *G06F 9/505* (2013.01); *G06F 3/067* (2013.01); *G06F 3/0613* (2013.01); *G06F 3/0631* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |

(Continued)

OTHER PUBLICATIONS

U.S. Appl. No. 14/986,351, Office Action dated May 18, 2017, 17 pages.

(Continued)

*Primary Examiner* — Dong Kim
(74) *Attorney, Agent, or Firm* — Sterne, Kessler, Goldstein & Fox PLLC

(57) ABSTRACT

The technology disclosed relates to maintaining throughput of a stream processing framework while increasing processing load. In particular, it relates to defining a container over at least one worker node that has a plurality workers, with one worker utilizing a whole core within a worker node, and queuing data from one or more incoming near real-time (NRT) data streams in multiple pipelines that run in the container and have connections to at least one common resource external to the container. It further relates to concurrently executing the pipelines at a number of workers as batches, and limiting simultaneous connections to the common resource to the number of workers by providing a shared connection to a set of batches running on a same worker regardless of the pipelines to which the batches in the set belong.

20 Claims, 21 Drawing Sheets

(56) References Cited

U.S. PATENT DOCUMENTS

| | | |
|---|---|---|
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Psounis et al. |
| 7,620,655 B1 | 11/2009 | Larsson et al. |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,756,275 B2 | 6/2014 | Jakobson |
| 8,769,004 B2 | 7/2014 | Jakobson |
| 8,769,017 B2 | 7/2014 | Jakobson |
| 9,674,249 B1 | 6/2017 | Kekre et al. |
| 9,680,893 B2 | 6/2017 | Banerjee et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0149717 A1* | 8/2003 | Heinzman ............ G06F 9/5038 718/101 |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2007/0088970 A1 | 4/2007 | Buxton et al. |
| 2007/0214381 A1 | 9/2007 | Goyal et al. |
| 2008/0249972 A1 | 10/2008 | Dillon |
| 2009/0049451 A1* | 2/2009 | Bates .................... G06F 9/461 718/108 |
| 2009/0063415 A1 | 3/2009 | Chatfield et al. |
| 2009/0100342 A1 | 4/2009 | Jakobson |
| 2009/0171999 A1 | 7/2009 | McColl et al. |
| 2009/0177744 A1 | 7/2009 | Marlow et al. |
| 2010/0077403 A1 | 3/2010 | Yang et al. |
| 2010/0153687 A1* | 6/2010 | Koda .................... G06F 9/5083 712/36 |

(56) References Cited

U.S. PATENT DOCUMENTS

| | | |
|---|---|---|
| 2010/0229178 A1 | 9/2010 | Ito |
| 2010/0293535 A1* | 11/2010 | Andrade .................. G06F 8/44 717/156 |
| 2011/0218958 A1 | 9/2011 | Warshaysky et al. |
| 2011/0247051 A1 | 10/2011 | Bulumulla et al. |
| 2012/0042218 A1 | 2/2012 | Cinarkaya et al. |
| 2012/0137018 A1* | 5/2012 | Uhlig .................. G06F 11/004 709/231 |
| 2012/0233137 A1 | 9/2012 | Jakobson et al. |
| 2012/0278811 A1 | 11/2012 | Baynast et al. |
| 2012/0290407 A1 | 11/2012 | Hubbard et al. |
| 2013/0007753 A1 | 1/2013 | Jain |
| 2013/0031550 A1 | 1/2013 | Choudhury et al. |
| 2013/0111489 A1 | 5/2013 | Glew et al. |
| 2013/0117270 A1* | 5/2013 | Sullivan ................. H04N 19/44 707/740 |
| 2013/0212497 A1 | 8/2013 | Zelenko et al. |
| 2013/0247216 A1 | 9/2013 | Cinarkaya et al. |
| 2013/0254771 A1 | 9/2013 | Musayev et al. |
| 2013/0290367 A1* | 10/2013 | Kashiyama ....... G06F 17/30551 707/769 |
| 2013/0326058 A1 | 12/2013 | Brady et al. |
| 2014/0019729 A1 | 1/2014 | Pell et al. |
| 2014/0208331 A1 | 7/2014 | Li et al. |
| 2014/0237477 A1 | 8/2014 | Cadambi et al. |
| 2014/0259024 A1* | 9/2014 | Sridharan ................ G06F 9/485 718/106 |
| 2014/0304545 A1 | 10/2014 | Chen et al. |
| 2014/0317448 A1 | 10/2014 | Rash et al. |
| 2015/0128144 A1 | 5/2015 | Mansell |
| 2015/0169341 A1 | 6/2015 | Gulati et al. |
| 2015/0339158 A1 | 11/2015 | Harris et al. |
| 2015/0358425 A1 | 12/2015 | Vennelakanti et al. |
| 2016/0062785 A1 | 3/2016 | Kumeta et al. |
| 2016/0139946 A1 | 5/2016 | Gardner et al. |
| 2016/0219089 A1 | 7/2016 | Murthy et al. |
| 2016/0269247 A1 | 9/2016 | Chakradhar et al. |

OTHER PUBLICATIONS

Boykin, et al., "Summingbird: A Framework for Integrating Batch and Online MapReduce Computations," Twitter, Inc., Proceedings of the VLDB Endowment, vol. 7, No. 13, (2014) pp. 1441-1451.

Haltian Ltd., "Thingsee Engine API", Ver 01.00, Mar. 7, 2015, 24 pages.

U.S. Appl. No. 14/986,351—Response to Office Action dated May 18, 2017 filed Aug. 13, 2017, 17 pages.

U.S. Appl. No. 15/004,887—Office Action dated Jul. 12, 2017, 27 pages.

U.S. Appl. No. 14/986,419—Notice of Allowance dated Aug. 9, 2017, 38 pages.

U.S. Appl. No. 14/986,351—Office Action dated Nov. 29, 2017, 19 pages.

U.S. Appl. No. 15/004,887—Response to Office Action dated Jul. 12, 2017, filed Oct. 12, 2017, 10 pages.

U.S. Appl. No. 15/004,887—Notice of Allowance dated Dec. 7, 2017, 5 pages.

* cited by examiner

MAINTAINING THROUGHPUT OF A STREAM PROCESSING FRAMEWORK WHILE INCREASING PROCESSING LOAD

PRIORITY APPLICATION

This application is related to and claims the benefit of U.S. Provisional Patent Application 62/220,827, "MAINTAINING THROUGHPUT OF A STREAM PROCESSING FRAMEWORK WHILE INCREASING PROCESSING LOAD", filed on Sep. 18, 2015. The priority provisional application is hereby incorporated by reference for all purposes.

RELATED APPLICATIONS

This application is related to U.S. patent application Ser. No. 14/936,141, entitled "SIMPLIFIED ENTITY LIFE-CYCLE MANAGEMENT" filed on Nov. 9, 2015. The related application is hereby incorporated by reference for all purposes.

This application is related to U.S. patent application Ser. No. 14/931,658, entitled "SIMPLIFIED ENTITY ENGAGEMENT AUTOMATION" filed on Nov. 3, 2015. The related application is hereby incorporated by reference for all purposes.

This application is related to U.S. patent application filed contemporaneously entitled, "HANDLING MULTIPLE TASK SEQUENCES IN A STREAM PROCESSING framework," Ser. No. 14/986,351. The related application is hereby incorporated by reference for all purposes.

This application is related to U.S. patent application filed contemporaneously entitled, "PROVIDING STRONG ORDERING IN MULTI-STAGE STREAMING PROCESSING," Ser. No. 14/986,365. The related application is hereby incorporated by reference for all purposes.

This application is related to U.S. patent application filed contemporaneously entitled, "MANAGING PROCESSING OF LONG TAIL TASK SEQUENCES IN A STREAM PROCESSING FRAMEWORK" Ser. No. 14/986,419. The related application is hereby incorporated by reference for all purposes.

This application is related to US Provisional patent application filed contemporaneously, entitled "SUB-SECOND RESPONSES TO COMPLEX ANALYTICAL QUERIES USING COMBINATION OF BATCH AND STREAM PROCESSING" 62/220,811. The related application is hereby incorporated by reference for all purposes.

FIELD OF THE TECHNOLOGY DISCLOSED

The technology disclosed relates generally to a processing framework for stream processing systems, and in particular to providing an improved stream processing framework that uses a combination of concurrent and multiplexed processing.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

The technology disclosed relates to maintaining throughput of a stream processing framework while increasing processing load. In particular, it relates to defining a container over at least one worker node that has a plurality workers, with one worker utilizing a whole core within a worker node, and queuing data from one or more incoming near real-time (NRT) data streams in multiple pipelines that run in the container and have connections to at least one common resource external to the container. It further relates to concurrently executing the pipelines at a number of workers as batches, and limiting simultaneous connections to the common resource to the number of workers by providing a shared connection to a set of batches running on a same worker regardless of the pipelines to which the batches in the set belong.

The technology disclosed reduces the amount of dedicated hardware and clients required to connect multiple pipelines in a container to common resources. For example, if thousand pipelines are processed over hundred worker nodes in a container, then at least ten connections are needed to be configured with relevant container resources such as a message bus (like Apache Kafka™), an output queue or sink (like Apache Kafka™), a persistence store (like Apache Cassandra™) and a global service registry (Zookeeper™). Thus, in total, for such a container, a thousand connections need to be made to each of the different relevant resources.

The technology disclosed solves this technical problem by allowing the multiple pipelines in a container to connect to relevant resources using common connections, thereby substantially reducing the number of simultaneous connections to relevant container resources.

For many analytic solutions, batch processing systems are not sufficient for providing real-time results because of their loading and processing requirements: it can take hours to run batch jobs. As a result, analytics on events can only be generated long after the events have occurred. In contrast, the shortcoming of streaming processing analytics systems is that they do not always provide the level of accuracy and completeness that the batch processing systems provide. The technology disclosed uses a combination of batch and streaming processing modes to deliver contextual responses to complex analytics queries with low-latency on a real-time basis.

In today's world, we are dealing with huge data volumes, popularly referred to as "Big Data". Web applications that serve and manage millions of Internet users, such as Facebook™, Instagram™, Twitter™, banking websites, or even online retail shops, such as Amazon.com™ or eBay™ are faced with the challenge of ingesting high volumes of data as fast as possible so that the end users can be provided with a real-time experience.

Another major contributor to Big Data is a concept and paradigm called "Internet of Things" (IoT). IoT is about a pervasive presence in the environment of a variety of things/objects that through wireless and wired connections are able to interact with each other and cooperate with other things/objects to create new applications/services. These applications/services are in areas likes smart cities (regions), smart car and mobility, smart home and assisted living, smart industries, public safety, energy and environmental protection, agriculture and tourism.

In today's world, we are dealing with huge data volumes, popularly referred to as "Big Data". Web applications that serve and manage millions of Internet users, such as Facebook™, Instagram™, Twitter™, banking websites, or even online retail shops, such as Amazon.com™ or eBay™ are faced with the challenge of ingesting high volumes of data as fast as possible so that the end users can be provided with a real-time experience.

Another major contributor to Big Data is a concept and paradigm called "Internet of Things" (IoT). IoT is about a pervasive presence in the environment of a variety of things/objects that through wireless and wired connections are able to interact with each other and cooperate with other things/objects to create new applications/services. These applications/services are in areas likes smart cities (regions), smart car and mobility, smart home and assisted living, smart industries, public safety, energy and environmental protection, agriculture and tourism.

Currently, there is a need to make such IoT applications/services more accessible to non-experts. Till now, non-experts who have highly valuable non-technical domain knowledge have cheered from the sidelines of the IoT ecosystem because of the IoT ecosystem's reliance on tech-heavy products that require substantial programming experience. Thus, it has become imperative to increase the non-experts' ability to independently combine and harness big data computing and analytics without reliance on expensive technical consultants.

Stream processing is quickly becoming a crucial component of Big Data processing solutions for enterprises, with many popular open-source stream processing systems available today, including Apache Storm™, Apache Spark™, Apache Samza™, Apache Flink™, and others. Many of these stream processing solutions offer default schedulers that evenly distribute processing tasks between the available computation resources using a round-robin strategy. However, such a strategy is not cost effective because substantial computation time and resources are lost during assignment and re-assignment of tasks to the correct sequence of computation resources in the stream processing system, thereby introducing significant latency in the system.

Also, an opportunity arises to provide systems and methods that use simple and easily codable declarative language based solutions to execute big data computing and analytics tasks.

Further, an opportunity arises to provide systems and methods that use a combination of concurrent and multiplexed processing schemes to adapt to the varying computational requirements and availability in a stream processing system with little performance loss or added complexity. Increased revenue, higher user retention, improved user engagement and experience may result.

SUMMARY

A simplified summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of this summary is to present some concepts related to some exemplary non-limiting implementations in a simplified form as a prelude to the more detailed description of the various implementations that follow.

The technology disclosed relates to maintaining throughput of a stream processing framework while increasing processing load. In particular, it relates to defining a container over at least one worker node that has a plurality of workers, with one worker utilizing a whole processor core within a worker node, and queuing data from one or more incoming near real-time (NRT) data streams in multiple pipelines that run in the container and have connections to at least one common resource external to the container. It further relates to concurrently executing the pipelines at a number of workers as batches, and limiting simultaneous connections between the common resource and the workers by providing a shared connection to a set of batches running on a same worker regardless of the pipelines to which the batches in the set belong.

Other aspects and advantages of the technology disclosed can be seen on review of the drawings, the detailed description and the claims, which follow.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

Figure 1:
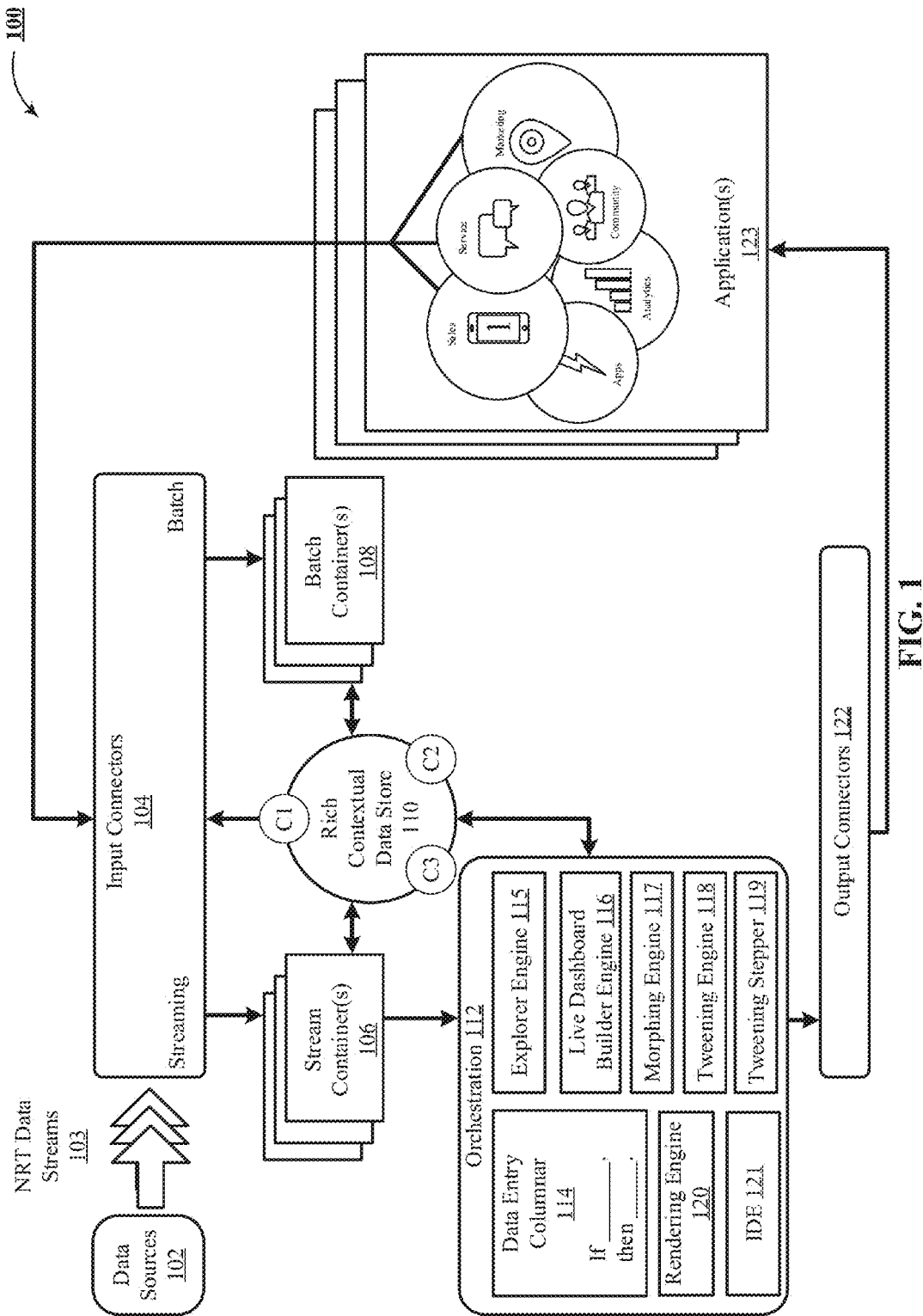
FIG. 1 depicts an exemplary IoT platform.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

The discussion is organized as follows. First, an explanation of terminology that will be used throughout the discussion is provided, followed by an introduction describing some of the technical problems addressed and technical solutions offered by various implementations. Then, a high-level description of some implementations will be discussed at an architectural level. Also, a state machine implementing an entity management workflow is described. Further, some user interface views used by some implementations will be presented. Next, more focused actions for implementing the system, together with data entry models, transitive triggers and condition definitions are discussed. Lastly, some particular implementations are discussed.

TERMINOLOGY

Task Sequence: A "task sequence" is defined as a designed effort or process, usually implemented by an experience operator (e.g. company, organization), to enable effective user management and resource provisioning, application life cycle management, workflow implementation, user engagement, traffic monitoring, activity tracking, provisioning for application modeling, etc. A task sequence involves collection of data from a large number of entities and subsequent processing of the collected data. Data for a task sequence is received as continuous near real-time (NRT) data streams, which are processed to generate real-time analytics. In one illustrative example, a task sequence is a ride delivery workflow set up by a cab sharing company like Uber™. The ride delivery workflow can involve multiple stages, such as (1) receiving a cab request from an end-user, (2) identifying the requested destination area, (3) discovering available Uber cab drivers in the destination area, (4) transmitting the cab request with contact information of the end-user to the available Uber cab drivers, (5) receiving ratification from at least one willing Uber cab driver, (6) notifying the end-user of the imminent cab arrival with cab vehicle information and (7) receiving confirmation from the end-user regarding accepting the cab delivery. Each of these seven stages involves exchange of a substantial amount of data, which gets processed in real-time to generate real-time analytics.

An augmentation of millions of such real-time user-requests and real-time responses applied over extended periods of time is defined as a task sequence. Other examples of a task sequence could be—receiving millions of e-mails every day for an entity operator like Microsoft™ and processing them in real-time to generate click metrics that identify which users clicked on certain web links included in the e-mails, receiving millions of requests from users of Uber™ to redeem ride discount coupons distributed by Uber™, and receiving millions of tweets about a music concert. This application interchangeably refers to a "task sequence" as an "entity experience operation", and vice-versa.

Long Tail Task Sequence: A "long tail task sequence" is a task sequence that consumes dedicated computing resources which, when properly sized for the beginning of the task sequence, are excessive as the task sequence tails off. An example of a long tail task sequence is the giving of fantasy football game tokens during a Super Bowl by a gaming company. Once the demand for fantasy football tapers after the Super Bowl, the use of the game tokens decreases. As a result, the number of game token redemption requests electronically received also decreases. However, the gaming company continues to honor the unused tokens that are redeemed slowly over a long period after the Super Bowl. This extended lull can be characterized by a long tail task sequence because it does not require as many computation resources as does the surge during the Super Bowl, and thus token handling can be completed using fewer computational resources than initially allotted.

Container: A stream processing framework is built using an API (application programming interface) and deployed as a cluster called a "container". The container takes care of the distribution of tasks/jobs within a given infrastructure and the API is designed to handle message passing, task/job discovery and fault-tolerance. This application interchangeably refers to a "container" as a "stream container", and vice-versa. This application interchangeably refers to a "container" or a collection of containers as a "grid", and vice-versa.

Worker Node: A container groups a set of physical machines called "worker nodes".

Physical Thread: Once deployed, a container operates over of a set of so-called "physical threads". A physical thread utilizes a processor core of a worker node and runs inside a set of code processes (e.g., Java processes) that are distributed over the worker node, no more than one physical thread per core. A physical thread also carries out the logic of a set of tasks/jobs for different elements and components (e.g., emitters and transformers) of a container.

Emitter: Data enters a container through a so-called "emitter". Emitters are event tuple sources for a container and are responsible for getting the event tuples into the container. In one implementation, emitters pull event tuples from input queues. In some implementations, emitters include user-specified conversion functions, such that they consume byte strings from an input queue and forward them as tuples to downstream transformers. An emitter retrieves one or more tasks/jobs to be executed by one or more physical threads of a worker node.

Transformers: A transformer is a computation unit of a container that processes the incoming event tuples in the container and passes them to the next set of transformers downstream in the container. A transformer passes one or more tasks/jobs downstream, typically to be further transformed one or more physical threads of a worker node.

Pipeline: A pipeline is defined as a sequence of operations performed on a group of event tuples from one or more NRT data streams. In one implementation, the grouping is on a tuple-by-type basis. In another implementation, the grouping is on batch-by-batch basis. In some implementations, each pipeline is identified by a unique pipeline identifier (ID). In one implementation, multiple NRT data streams can source data to one or more pipelines. In another implementation, a NRT data stream is queued to a task sequence in a single pipeline, which in turn is processed over a single container.

Batch: A batch is defined as an assemblage of event tuples partitioned on a time-slice basis and/or a batch-size basis and sequentially queued in a pipeline. A time-slice based definition includes partitioning at least one incoming NRT data stream by its most recently received portion within a time window (e.g., one batch keeps the event tuples from the last one second). A batch-size based definition includes partitioning at least one incoming NRT data stream by a most recently received portion limited or restricted to or constrained by a data size (e.g., one batch includes 10 MB of most recently received event tuples). In other implementations, a combination of time-size basis and batch-size basis is used to define batches. In some other implementations, each batch in a pipeline is identified by a unique batch identifier (ID).

Batch-Unit: A micro unit of work of a batch is called a batch-unit. A batch is subdivided into a set of batch units. In some implementations, different batch-units of a batch are processed in different stages at different computation units of a container, a concept referred to as "multi-stage processing". In some other implementations, a batch is transactional boundary of stream processing within a container, such a transaction is considered to be complete when a batch is completely processed and is considered incomplete when a batch overruns a time-out without all of its batch-units being processed.

Coordinator: The coordination between a pipeline that includes data to be processed and the worker nodes that process the data is carried out through a software component of the container called a "coordinator", which is in charge of distribution of tasks to the physical threads in a worker node. This application interchangeably refers to a "coordinator" as a "grid-coordinator", and vice-versa.

Scheduler: A scheduler tracks one or more pipelines in a container and communicates with the coordinator to schedule execution of batches in the container. In some implementations, a scheduler maintains the current batch stage information during multi-stage processing of a batch and communicates this information along with identification of the batch and pipeline to the coordinator. This application interchangeably refers to a "scheduler" as a "grid-scheduler", and vice-versa.

Parallelism: A container runs a user-specified number of logically parallel threads, fixed by a developer of a container. A "logically parallel threads" value specifies how many threads are to be simultaneously utilized by the container during processing of batches in a pipeline.

Near Real-Time Data Stream: A near real-time (NRT) data stream is defined as an unbounded sequence of event tuples that is processed in parallel and distributed among multiple worker nodes. In one implementation, a NRT data stream is defined as a collection of real-time events for a task sequence or a particular stage of a task sequence. In another implementation, a NRT data stream is defined as a collection of events that are registered as they are generated by an entity. In one implementation, a NRT data stream is an unbounded sequence of data tuples. In some implementations, a NRT data stream has an emission rate of one million events or tuples per second.

Stream Processing Framework: A "stream processing framework" is defined as a real-time stream processing system that represents an entire streaming application as a graph of computation. In some implementations, the stream processing framework processes NRT data streams for one or more task sequences to generate real-time analytics. This application interchangeably refers to a "stream processing framework" as a "stream processing system", and vice-versa.

Internet of Things Platform: The "Internet of Things (IoT) platform" disclosed herein is defined as an integrated environment that collects and processes a high volume of data from a plurality of entities in real-time or near real-time, often with low latency. In some instances, processing logic can be applied to the data to generate real-time or near real-time analytics. In one implementation, an IoT platform is defined as an integrated framework that utilizes computation over a combination of stream mode and batch mode to periodically generate aggregates using batch and offline analytics and substitute results from real-time data streams to generate real-time analytics by performing computational tasks like data mining, machine learning, statistical processing, predictive analytics, time series analysis, rule based processing, complex event processing, pattern detection, correlation and more. In one implementation, the IoT platform offers a high throughput of the order of processing one million tuples per second per node. In another implementation, the IoT platform offers insights to end-users in the form of rich visualization, using GUI and/or API based tools like standard graphs, bars, charts and overlaid infographics.

Event: An event is any identifiable unit of data that conveys information about an occurrence. In one implementation, an event can also provide information concerning an entity. An event can have three aspects: a timestamp indicating when the event occurred; a set of dimensions indicating various attributes about the event; and a set of metrics related to the event. Events can be user-generated events such as keystrokes and mouse clicks, among a wide variety of other possibilities. System-generated events include statistics (e.g. latency/number of bytes, etc.), program loading and errors, also among a wide variety of other possibilities. In one implementation, events include network flow variables, device information, user and group information, information on an application (e.g., resource condition, variables and custom triggered events). An event typically represents some message, token, count, pattern, value, or marker that can be recognized within a NRT data stream, such as network traffic, specific error conditions or signals, thresholds crossed, counts accumulated, and so on. A typical user interaction with an application like Pardot™ processes a sequence of events that occur in the context of a session. The main events of note are (a) login—provide user credentials to hosted service to authenticate the user; (b) application transactions—execute a set of application level transactions, e.g. add leads or define new operations; and (c) log-out—this event terminates the session with the server. In some implementations, deep packet inspection logic tracks raw event data to identify events and stores them in an event repository. This application, in some implementations, interchangeably refers to "events" as "data", and vice-versa. Other examples of events generated by or about various entities include telemetry from a wearable sensor, data from a smart watch, data and/or metadata generated by a user using a feature of an application (such as Microsoft Word™), trip or journey data generated from a GPS used by a driver starting or completing a trip, data generated by a vehicle reporting speed or location information, data generated by a medical device reporting a sensor reading, etc.

Entity: An entity is defined as a thing or object that interacts and communicates with other things or objects and with the environment by exchanging data and information sensed about the environment while reacting to real/physical world events, to provide services for information transfer, analytics, applications and communications. Examples of entities include humans, online social networks, wireless/wired sensors, smart phones, smart watches, application PCs, PCs, laptops, tablets, IP telephones, servers, application servers, cameras, scanners, printers, near-field communication devices like RFID tags and RFID readers, vehicles, biomedical equipment, and others. In some implementations, the singular "entity" and the plural "entities" are used interchangeably in this application for clarity. In this application, in some implementations, "entities" are "data sources", "users", and other actors.

Online Social Network: An "online social network" is defined as any combination of software, protocols and/or hardware configured to allow a community of users or individuals and/or other entities to share information, resources and the like via a computer network (such as the Internet). An online social network uses a platform like a website, blog or forum to foster interaction, engagement and information sharing. Some examples of an online social network include Facebook™, Twitter™, YouTube™, Flickr™, Picasa™, Digg™, RSS™, Blogs™ Reddit™, LinkedIn™, Wikipedia™, Pinterest™, Google Plus+™, MySpace™, Bitly™ and the like. This application, in some implementations, interchangeably refers to "online social network" as "social network", "social media site", "social networking service", "social media source" and "social networking entity", and vice-versa.

Application Programming Interface: An "application programming interface (API)" is defined as a packaged collection of code libraries, methods and fields that belong to a set of classes, including its interface types. The API defines the way that developers and programmers can use the classes for their own software development, just by importing the relevant classes and writing statements that instantiate the classes and call their methods and fields. In another implementation, an API is a source code based specification intended to be used as an interface by software components to communicate with each other. An API can include specifications for routines, data structures, object classes and variables. Basically, an API provides an interface for developers and programmers to access the underlying platform capabilities and features of online social networks. For example, Twitter's Search API involves polling Twitter's data through a search or username. Twitter's Search API gives developers and programmers access to data set that already exists from tweets which have occurred. Through the Search API, developers and programmers request tweets that match search criteria. The criteria can be keywords, usernames, locations, named places, etc. In another example, Twitter's Streaming API is a push of data as tweets are posted in near real-time. With Twitter's Streaming API, developers and programmers register a set of criteria (e.g., keywords, usernames, locations, named places, etc.) and as tweets match the criteria, they are pushed directly to the developers and programmers. In yet another example, Twitter Firehose pushes data to developers and programmers in near real-time and guarantees delivery of all the tweets that match the set criteria.

Application: An application refers to a network hosted service accessed via a uniform resource locator (URL). Examples include software as a service (SaaS) offerings, platform as a service (PaaS) offerings, and infrastructure as a service (IaaS) offerings, as well as internal enterprise applications. Examples of applications include Salesforce1 Platform™, Sales Cloud™ Data.com™, Service Cloud™, Desk.com™, Marketing Cloud™, Pardot™, Wave Analytics™ Box.net™, Dropbox™, Google Apps™, Amazon AWS™, Microsoft Office 365™, Workday™ Oracle on Demand™, Taleo™, Yammer™ and Concur™. In one implementation, an application offers insights to end-users in the form of rich visualization, using GUI and/or API based tools like standard graphs, bars, charts and overlaid infographics.

Identification: As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify."

Introduction

The technology disclosed reduces the amount of dedicated hardware and clients required to connect multiple pipelines in a container to common resources. For example, if a thousand pipelines are processed over a hundred worker nodes in a container, then at least ten connections need to be configured with relevant container resources such as a message bus (like Apache Kafka™), an output queue or sink (like Apache Kafka™), a persistence store (like Apache Cassandra™) and a global service registry (Zookeeper™). Thus, in total, for such a container, a thousand connections need to be made to each of the different relevant resources.

The technology disclosed solves this technical problem by allowing the multiple pipelines in a container to connect to relevant resources using common connections, thereby substantially reducing the number of simultaneous connections to relevant container resources.

The technology disclosed relates to maintaining throughput of a stream processing framework while increasing processing load. In particular, it relates to defining a container over at least one worker node that has a plurality workers, with one worker utilizing a whole core within a worker node, and queuing data from one or more incoming near real-time (NRT) data streams in multiple pipelines that run in the container and have connections to at least one common resource external to the container. It further relates to concurrently executing the pipelines at a number of workers as batches, and limiting simultaneous connections between the common resource and the workers by providing a shared connection used to process a set of batches running on a same worker regardless of the pipelines to which the batches in the set belong.

Our world today is composed of the 1s and 0s that make up the binary code created by the streams of data flowing through every sector of the global economy. How much data is that?

According to IBM,1 2.5 exabytes of data were created every day in 2012. That is 2.5 billion gigabytes of data in a single day. Facebook alone was responsible for 500,000 gigabytes a day in the same year. The importance of data is becoming so big, even the U.S. Government has launched an initiative, Data.gov, to help access and analyze it. The good news is that data processing and storage costs have decreased by a factor of more than 1,000 over the past decade. But once that data is stored, it is difficult to retrieve and use.

According to The Boston Consulting Group, one third of all bank data is never used. A big part of this is the fact that 75% of the data we generate is unstructured. It is randomly organized, difficult to index, and therefore difficult to retrieve.

Where is all of this data coming from? An obvious source is the data that is being generated from legacy systems of record. It is data from cloud software as witnessed by the rapid adoption of Software as a Service (SaaS) as the new business application model.

It is data being created every second from mobile phones, devices, and sensors that are being placed on just about everything that can be monitored in the physical world. And social media represents the largest data streams, which are being created in astronomical volumes.

Forget about texts and think of all the photos and videos being uploaded via smartphones to popular services like YouTube, Facebook, Instagram, and Twitter.

The smartphone is currently the major enabler of this data tsunami. PCs and feature phones (mobile phones that are not smartphones) are both in decline while smartphones are growing in the opposite direction, even in regions such as sub-Saharan Africa. And where there is a smartphone, there is an application for practically every human endeavor.

Applications are the smartphone control point for all of the real-time data streams being created by our fingers, the camera, the motion sensor, GPS antenna, Bluetooth antenna, and gyroscope. Smartphone manufacturers continue to jam more sensors and capabilities into these devices while developers continue to build applications that delight us all.

According to The Economist, 50% of the adult population in 2015 owns a smartphone. That will grow to 80% in 2020. But as impressive as smartphones are, the biggest ripple is just forming. To use a term coined by Andreessen Horowitz, it is the "sensorification" of the physical world. The combination of cheap, connected, miniaturized computers and sensors will create a world of smart, connected products and industrial equipment.

This new technology category is often called the "Internet of Things" (IoT). General Electric goes one step further, with the term "industrial internet", to include things like jet engines, locomotives, and MRI machines.

The Internet of Things represents a major and transformational wave of IT innovation. The Harvard Business Review calls this the third wave of IT-driven competition, with the first two waves brought by mainframes and minicomputers, and the rise of the Internet. Needless to say, harnessing and analyzing these data streams will represent the biggest challenge IT and businesses will face over the next decade.

The apt term used to describe this massive volume of data is "Big Data. For Big Data, traditional data storage technology is inadequate to deal with these large, high-speed volumes. And the challenges don not end there.

Enterprises will also need to figure out how to not only capture this data, but how to search, analyze, and visualize it as well as connect it with their business and customer data. The ultimate goal is the ability to perform predictive analytics and real-time intelligent decision-making. This is going to require an IT transformation from systems of record to systems of intelligence.

Before the advent of big data, the concept of business intelligence (BI) had already become a commonly used phrase back in the 1990s. A number of newly formed BI software vendors also entered the market at that time.

BI provided the methods and tools required for the transformation of data into meaningful and useful information for the business. The functions of BI during this period were fairly basic, namely, to collect and organize the data and visualize it in a presentable way.

Innovations continued and the introduction of data warehouses drastically reduced the time it took to access enterprise data from systems of record. Despite these innovations, a core challenge remains. Setting up these data warehouses requires deep expertise and using BI tools requires significant training.

The mere mortals in the line of business still cannot use these tools in an accessible way. Most BI tools are pretty good at getting answers when you know ahead of time the questions you are asking. Sometimes you simply do not know what questions to ask. In short, these tools do not enable business users to obtain the insights when, how, and where they need them.

Fortunately, this is all changing. For the first time, data analytics tools are being built that are entirely designed and run in the cloud. There is no need for IT to provision hardware or install and configure the data platform. Performing all the associated integration and schema development has gone from months to days. This newfound agility has allowed innovation in technology to eliminate the traditional two-step service bureau model where every request from the line of business required It is involvement.

These innovations are paving the way for a democratization of data so that business users can not only get access to data but also participate in its analysis. This means a self-service model with direct access to answers without the need for analysts, data scientists, or IT. Business users can find and share answers almost instantly. There is no hard requirement of needing to know ahead of time what questions to ask of the data. Business users can quickly bang out questions that allow them to explore and gain insights into the data sets.

Furthermore, this democratization is powered by mobile. Using their smartphone, tablets, or wearables, workers can now gain access to data and answers to pressing business questions whenever and wherever they are. The democratization of data has become a necessary phase in the journey toward building systems of intelligence.

While the fruits of data democratization are plenty, the process itself mostly deals with empowering business users with access to and analysis of data from legacy systems of record and cloud-based business applications. At best, some of these new BI tools can provide near real-time access and analysis of data. But they are not engineered for capturing and analyzing actual real-time streams of data emanating from smartphones, wearables, and the coming explosion of sensors in the physical world.

Real-time data streams deliver information that is quite different from the backward-looking, historical data most BI tools and platforms harness. Real-time data is perishable. That means it not only needs to be detected, it needs to be acted upon. The concept of "time to insight" emerges as one of the key performance indicators for systems of intelligence. These insights are going to require a whole new of level packaging and consumption. The information needs to be delivered in context, at the right time, and in a way that cuts through the cacophony of data we are exposed to in our daily work lives.

Systems of intelligence require knowing what to do with the data insights and how they should be delivered to the appropriate workers based on their job function and role inside the organization. These systems are every bit as democratic as modern BI tools in that they are easy to configure and get up and running. They are also designed to deal with the daily deluge of data we are confronted with every day at work. Consumer applications such as social media, traffic, and news aggregating applications help us more intelligently deal with the things that matter to us most.

The bar for applications connected to our systems of intelligence is as high as for consumer applications. This means one click installation, a lovely and simple user interface, and accessibility via the mobile device of your choosing. The harnessing and analysis of real-time data streams begins to open up not only action in real time, but the ability to anticipate what is going to happen. This has traditionally been the realm of data scientists who handle everything from statistics and computational modeling to visualization and reporting. Models created by data scientists mostly look at past historical trends and use the data to predict patterns and future trends. Trying to build computational models that look at large volumes of real-time data streams presents a significant human resource challenge for enterprises.

According to McKinsey Global Institute, by 2018, the United States alone could face a shortage of 140,000 to 190,000 people with deep analytical skills as well as a shortage of 1.5 million managers and analysts with the know-how to use the analysis of big data to make effective decisions.

Few companies have the data scientists to both analyze real-time big data streams and do something with it. Many organizations simply cannot fill existing open jobs with qualified individuals. Nor will universities prepare enough data scientists to meet the demand in the coming years. But let's say you get your data scientists in place to analyze and structure the data. What next? How do you translate this into something actionable? How do you train your line managers and directors to make sense of the analysis in order to make the right decisions?

While systems of intelligence will not be replacing data scientists anytime soon, these systems will go a long way toward alleviating the need to hire a huge staff of data scientists. Systems of intelligence harness and scale the collective wisdom, expertise, and gained insights of the organization such that intelligent decision-making becomes the sum of all these. The collective intelligence can be expressed like rules in a rules engine. These are powerful tools that allow business users to take this collective intelligence and compose simple, logical business rules that evaluate and analyze real-time data streams to produce intelligent decisions.

Data science includes the process of formulating a quantitative question that can be answered with data, collecting and cleaning the data, analyzing the data, and communicating the answer to the question to a relevant audience.

Most of the initial fruits harvested by enterprises from their systems of intelligence will be of the low-hanging variety, namely, value obtained from the expression of simple business rules described above. But as organizations gain greater insights from their systems of intelligence and more devices and sensors become part of the equation, the role of algorithms and machine learning will play a larger part in intelligent decision-making.

Enterprises will increasingly turn to artificial intelligence as they will never be able to hire enough business analysts and data scientists to sift through all the data. Credit card fraud detection is a great example and it is becoming quite sophisticated.

Artificial intelligence does not totally eliminate the need for a trained fraud expert, but it drastically reduces the number of suspicious cases that require human investigation.

There will be many considerations to explore as organizations spin up their big data efforts. It is going to require the right people, the right tools, and the right methods. The technology that is coming together today is essentially unbounded in the sources and magnitudes of the data sets. It is ready to handle ad hoc questions to whatever depth you care to go.

The next step beyond this are the systems of intelligence that start to tell customers what questions they need to be asking. Getting there will require a blueprint for systems of intelligence.

The source of data streams are the signals emanating in real-time from mobile devices such as smartphones and consumer wearables like the Fitbit and Apple Watch. The control point for these signals is the application.

The application is what puts context behind the raw data that gets created by human inputs and the sensors embedded in these devices.

According to Wikipedia, a sensor is a transducer whose purpose is to sense or detect some characteristic of its environs. It detects events or changes in quantities and provides a corresponding output, generally as an electrical or optical signal.

Tying all of this together is the digital plumbing, or application programming interfaces (APIs). Along every critical element of the data stream flow represented in this schematic, APIs will enable this end to end transport of high speed and high volume data in the system. Although the term, API, may not be in the common vernacular outside of IT, it will be, much in the same way that terms of art to describe the web and internet are common language in business communication today.

The major gushers of data streams will be the connected consumer products and industrial equipment and machines. These real-time signals will emanate from product sensors inside our automobiles, inside our homes, on our valuables, our security systems, and anywhere in our physical environment that matters.

Signals from the industrial internet will emanate from sensors on any piece of equipment or machine that requires monitoring, maintenance and repair. Anything than can be digitally monitored with sensors in the physical environment will be. Systems of intelligence must be able to identify these signals and harness them.

In order to capture the high-volume and high-speed data signals, a "digital watchdog" is needed to monitor these signal inputs. If anything significant happens with these digital signals, an event is registered. A very simple example of an event is when a temperature sensor goes off in your automobile to warn you of freezing conditions outside.

Systems of intelligence will require the technology to ingest and monitor these data streams. The events created by the digital signals get broadcasted via messages and moved through the system so that the digestion process can proceed as planned. This is where filters can begin their job of further analyzing these data streams. For the system to function properly, it must be able to handle growing volumes and increased speeds of data flow and must not be lost if there is a breakdown or crash in that system.

Once data is captured and processed, it moves along into the digestion phase. This is where some of the magic starts to happen. This includes the monitoring and analytical processing of real-time data streams. Once the data is analyzed and processed, it needs to be put somewhere.

The data streams flowing in are not suitable for traditional database storage such as relational databases using structured query language. This requires specialized technology that can handle and store very large data sets, an essential element of systems of intelligence.

Another key component of this system is the ability to apply filters in the form of business rules that get applied to the analysis of the data streams. This will begin the process of eliminating human errors by expressing the collective wisdom and expert knowledge of the organization directly into the system. Artificial intelligence in the form of machine learning and algorithms can also be applied to these data streams for further analysis.

Enterprise data is comprised of the systems of record and systems of engagement that represent the mainstream of enterprise IT today. As IT migrated from mainframes and minicomputers to PCs and the Internet, systems of record have largely been about moving what were paper and manual processes into the digital era. Systems of record have been about automating everyday activities, capturing of their information by products, and reporting what are essentially historical documents Systems of engagement are fundamentally different from systems of record in that they focus on the social nature of conversations and interactions with customers, partners and employees. Social media and the consumerization of IT shape how these conversations occur and across what channels. Instead of digital artifacts that are document based, systems of engagement add the elements of time, context, and place. Systems of record do not go away; it is just that enterprises need to embrace next-generation communication and collaboration with systems of engagement.

Systems of engagement and systems of record will be essential elements in providing context to the data streams, filtering, and analysis. You cannot make sense of the data streams and outputs if you do not have the full picture of the customer, the partner, the employee. These systems will be essential to illuminating the analytical insights and intelligent decisions driven by systems of intelligence.

After ingesting, digesting, and applying enterprise context to the data streams, the intelligent outputs are produced and delivered in the right form, at the right time, and to the right channel. The first two channels are dashboards and insights. Dashboards drive visualization and context of what is and what has happened so that humans can explore and take actions like launching new company initiatives, tweaking existing marketing programs or refining the rules based on intelligent decision-making. Insights rely more on delivering real-time decision-making. It is a key difference between dashboards and analytical insights. Expressing the collective knowledge and expertise of the organization through business rules goes a long way toward eliminating bad decisions that are easily avoidable. As signals increase and data streams flow into systems of intelligence, data scientists will be able to better apply their methods and models to create machine learning algorithms that deliver intelligent decisions in a predictive manner.

Moving along to the final phase of our data streams journey, the enterprise can now begin to apply the fruits of the intelligent outputs to commence the transformation of the business. Our central premise is that behind every application, device, connected product, and sensor is a customer. The role of IoT platform disclosed herein is to connect your device data to the user success platform where you can engage customers through sales, customer service, marketing, communities, applications and analytics.

The technology disclosed improves existing streaming processing systems by providing the ability to both scale up and scale down resources within an infrastructure of a stream processing system. In addition, the technology disclosed leverages common dependencies between task sequences running in a container to reduce the strain on shared resources by eliminating dedicated per-pipeline hardware. Furthermore, the technology disclosed introduces natural elasticity to stream processing systems by minimizing the impact of small workloads on the systems.

Apache Storm™, Apache Trident™, Apache Spark™, Apache Samza™, Apache Flink™, etc. and most existing stream processing systems have classically focused exclusively on scaling up and scaling out of computational resources in a quest for more performance. These systems do not typically perform well in a constrained resource environment such as a small two-to-three machine cluster. Spark for example simply starts crashing once its in-memory grid is exhausted and also requires a minimum of one dedicated core per consumed Kafka partition. Running a few hundred simultaneous consumers in these systems requires potentially hundreds of dedicated cores. Storm with a two-to-three machine cluster runs at most perhaps twelve task sequences before requiring addition of more machines. This really makes these platforms appropriate only for large scale data processing that can justify the dedicated hardware required (which is what they are designed to serve).

For smaller, trivial workloads or data patterns that have wild variance in their load over time, these platforms are extremely expensive due to the minimum cost of hardware associated with a single "job". What this means to a user is that they would typically need to decide whether a job is "big enough" to justify porting it to something like Storm or Spark.

The technology disclosed particularly singles out long tail task sequences that may initially have heavy activity but may need to remain active for months waiting for perhaps dozens of messages a day. In this case, a big-data platform is needed for the initial activity and after the initial early load, the dedicated hardware would have historically been wasted because it mostly was doing nothing. In Storm, no matter how trivial the workload, if there are a thousand topologies, at least 1000 workers are needed to run them, which equates to roughly 250 machine instances, if four workers are being run per machine. The technology disclosed allows for running one topology on a thousand machines or a thousand topologies on one machine.

The primary benefits of the technical solution include allowing users to run an arbitrary amount of work on a fixed hardware budget and allowing users to utilize the same environment, infrastructure and tools for both small and large jobs.

The technology disclosed also leverages common dependencies across task sequences. A job can always run in a dedicated container, which gives it full use of all available resources and excellent isolation from other processes. When jobs are multiplexed within the same container, they lose this isolation but gain locality which carries other benefits. For example, a typical application server shares a connection pool across all the applications hosted therein. The technology disclosed can greatly reduce the strain on shared resources such as databases and message buses like Kafka™, persistence stores like Cassandra™ and global service registry like ZooKeeper™. In the technology disclosed, connections to Kafka™ Cassandra™ and ZooKeeper™ are all shared across hosted pipelines, thereby greatly reducing the potential load on these services. In some cases, the technology disclosed can eliminate dedicated per-pipeline hardware by leveraging shared local caches of resources. For instance, dozens of pipelines can read from the same Kafka topic without the need to make a call to Kafka for every pipeline.

Large systems hosting multiple workloads tend to be more naturally elastic than dedicated systems. For example, threads doing small amounts of work introduce only small delays in busier threads because they only borrow shared resources for exactly the amount of time they are needed. Dedicated systems instead depend on monitoring and dynamic allocation of resources, ideally adding and removing servers as workloads change. This is complicated to implement and plan for with an accurate budget. The technology disclosed adapts a stream processing system to minimize the impact of small workloads, thereby making the system more naturally elastic and more gracefully changeable as workloads change. An example includes two tasks sequences, one for the U.S. and one for Europe. These two task sequences receive the bulk of their loads at opposite times of day. The technology disclosed applies most of the allocated resources (e.g. ninety percent) to the tasks sequence with actual load, without a complex system of adding boxes for the time from 12 am to 4 am on one task sequence and adding boxes for the time from 3 pm to 6 pm on the other.

The technology disclosed relates to simplifying for a non-programming user creation of an entity management workflow by using computer-implemented systems. The technology disclosed can be implemented in the context of any computer-implemented system including a database system, a multi-tenant environment, or a relational database implementation like an Oracle™ compatible database implementation, an IBM DB2 Enterprise Server™ compatible relational database implementation, a My SQL™ or PostgreSQL™ compatible relational database implementation or a Microsoft SQL Server™ compatible relational database implementation or a NoSQL non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation.

Moreover, the technology disclosed can be implemented using two or more separate and distinct computer-implemented systems that cooperate and communicate with one another. The technology disclosed can be implemented in numerous ways, including as a process, a method, an apparatus, a system, a device, a computer readable medium such as a non-transitory computer readable storage medium that stores computer readable instructions or computer program code, or as a computer program product comprising a computer usable medium having a computer readable program code embodied therein.

In addition, the technology disclosed can be implemented using different programming models like MapReduce™, bulk synchronous programming, MPI primitives, etc. or different stream management systems like Apache Storm™, Apache Spark™, Apace Kafka™, Truviso™, IBM InfoSphere™, Borealis™ and Yahoo! S4™.

IoT Platform and Stream-Batch Processing Framework

Figure 2:
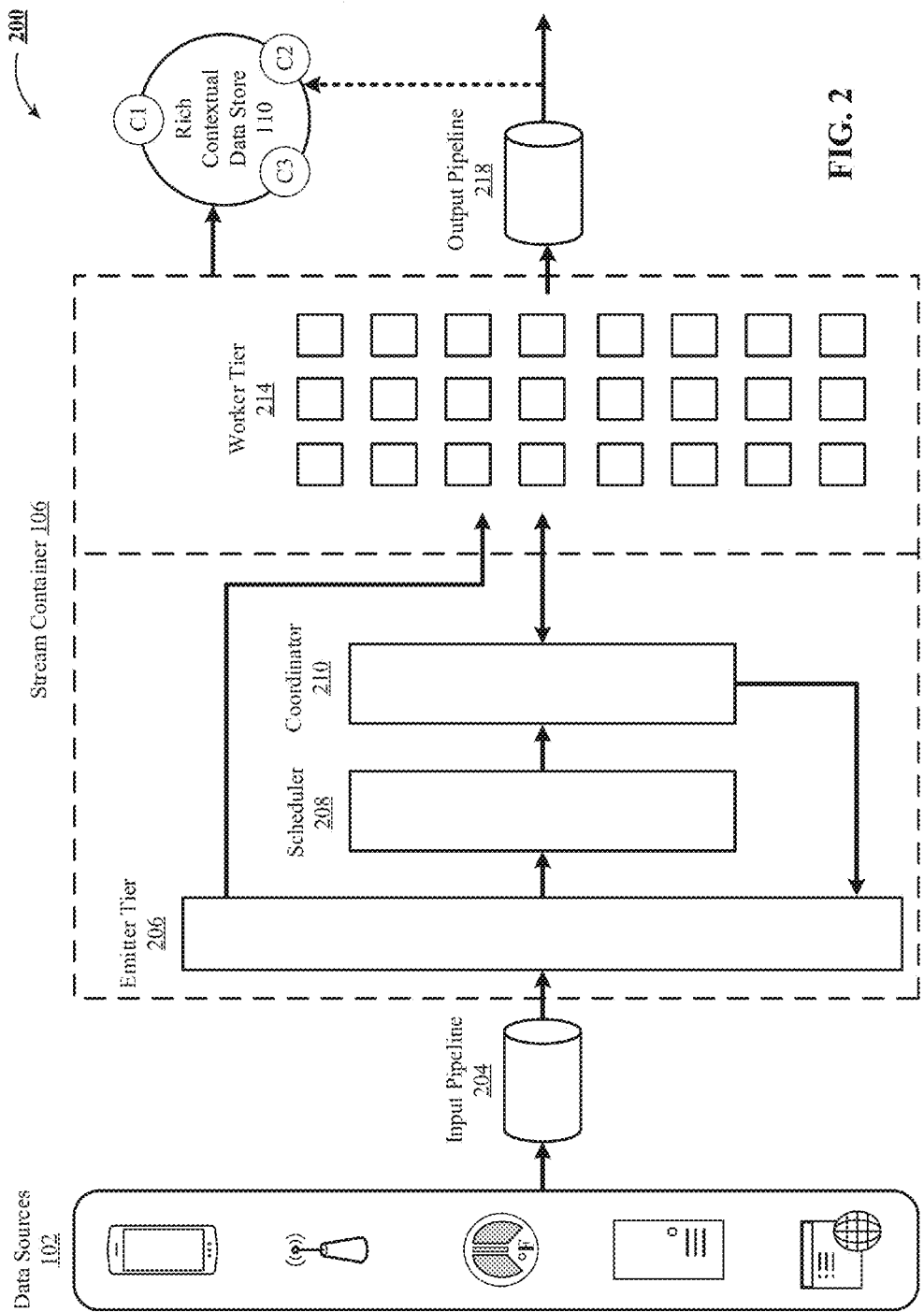
FIG. 2 illustrates a stream processing framework used in an IoT platform similar to the example IoT platform shown in FIG. 1, according to one implementation of the technology disclosed.

We describe a system and various implementations of simplifying for a non-programming user creation of an entity management workflow. The system and processes will be described with reference to FIG. 1 and FIG. 2 showing an architectural level schematic of a system in accordance with an implementation. Because FIG. 1 and FIG. 2 are architectural diagrams, certain details are intentionally omitted to improve the clarity of the description. The discussion of FIG. 1 and FIG. 2 will be organized as follows. First, the elements of respective figures will be described, followed by their interconnections. Then, the use of the elements in the system will be described in greater detail.

FIG. 1 includes exemplary IoT platform 100. IoT platform 100 includes data sources 102, input connectors 104, stream container(s) 106, batch container(s) 108, rich contextual data store 110, orchestration system 112, output connectors 122 and application(s) 123. The rich contextual data store 110 includes various storage nodes C1-C3. Orchestration 112 includes a data entry columnar 114, an explorer engine 115, a live dashboard builder engine 116, a morphing engine 117, a tweening engine 118, a tweening stepper 119, an integrated development environment (IDE) 121 and a rendering engine 120. Application(s) 123 include various SaaS, PaaS and IaaS offerings. In other implementations, platform 100 may not have the same elements as those listed above and/or may have other/different elements instead of, or in addition to, those listed above.

FIG. 2 illustrates a stream processing framework 200 used in the platform example shown in FIG. 1, according to one implementation of the technology disclosed. Framework 200 includes data sources 102, input pipeline 204, stream container 106, rich contextual data store 110 and output pipeline 218. Stream container 106 includes an emitter tier 206, a scheduler 208, a coordinator 210 and a worker tier 214. In other implementations, framework 200 may not have the same elements as those listed above and/or may have other/different elements instead of, or in addition to, those listed above.

The interconnection of the elements of IoT platform 100 and streaming framework 200 will now be described. A network (not shown) couples the data sources 102, the input connectors 104, the stream container 106, the batch container 108, the rich contextual data store 110, the orchestration system 112, the columnar 114, the output connectors 122, the application(s) 123, the input pipeline 204, the emitter tier 206, the scheduler 208, the coordinator 210, the worker tier 214 and the output pipeline 218, all in communication with each other (indicated by solid double-arrowed lines). The actual communication path can be point-to-point over public and/or private networks. Some items, such as data from data sources 102, might be delivered indirectly, e.g. via an application store (not shown). All of the communications can occur over a variety of networks, e.g. private networks, VPN, MPLS circuit, or Internet, and can use appropriate APIs and data interchange formats, e.g. REST, JSON, XML, SOAP and/or JMS. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi and WiMAX. Additionally, a variety of authorization and authentication techniques, such as username/ password, OAuth, Kerberos, SecureID, digital certificates and more, can be used to secure the communications.

Having described the elements of FIG. 1 (IoT platform 100) and FIG. 2 (streaming framework 200) and their interconnections, the system will now be described in greater detail.

Data sources 102 are entities such as a smart phone, a WiFi access point, a sensor or sensor network, a mobile application, a web client, a log from a server, a social media site, etc. In one implementation, data from data sources 102 are accessed via an API Application Programming Interface) that allows sensors, devices, gateways, proxies and other kinds of clients to register data sources 102 in the IoT platform 100 so that data can be ingested from them. Data from the data sources 102 can include events in the form of structured data (e.g. user profiles and the interest graph), unstructured text (e.g. tweets) and semi-structured interaction logs. Examples of events include device logs, clicks on links, impressions of recommendations, numbers of logins on a particular client, server logs, user's identities (sometimes referred to as user handles or user IDs and other times the users' actual names), content posted by a user to a respective feed on a social network service, social graph data, metadata including whether comments are posted in reply to a prior posting, events, news articles, and so forth. Events can be in a semi-structured data format like a JSON (JavaScript Option Notation), BSON (Binary JSON), XML, Protobuf, Avro or Thrift object, which presents string fields (or columns) and corresponding values of potentially different types like numbers, strings, arrays, objects, etc. JSON objects can be nested and the fields can be multi-valued, e.g., arrays, nested arrays, etc., in other implementations.

As described infra, near real-time (NRT) data streams 103 are collections of events that are registered as they are generated by an entity. In one implementation, events are delivered over HTTP to input pipeline 204. In another implementation, events are transmitted via POST requests to a receiver operating on behalf of input pipeline 204. For instance, Twitter Firehose API and Twitter4j (accessible via Twitter-affiliated companies like Datashift and nTweet-Streamer) provide unbounded time stamped events, called tweets, as a stream of JSON objects along with metadata about those tweets, including timestamp data about the tweets, user information, location, topics, keywords, retweets, followers, following, timeline, user line, etc. These JSON objects are stored in a schema-less or NoSQL key-value data-store like Apache Cassandra™, Google's BigTable™, HBase™, Voldemort™, CouchDB™, MongoDB™ Redis™, Riak™, Neo4j™, etc., which stores the parsed JSON objects using key spaces that are equivalent to a database in SQL. Each key space is divided into column families that are similar to tables and comprised of rows and sets of columns.

The input connectors 104 acquire data from data sources 102 and transform the data into an input format that is consumable by containers 106 and 108. In one implementation, the input connectors 104 perform full data pulls and/or incremental data pulls from the data sources 102. In another implementation, the input connectors 104 also access metadata from the data sources 102. For instance, the input connectors 104 issue a "describe" API call to fetch the metadata for an entity and then issue the appropriate API call to fetch the data for the entity. In some implementations, customized input connectors 104 are written using the Connector SDK™ for individual data sources 102.

In other implementations, a workflow definition includes a collection of connectors and operators as well as the order to execute them. In one implementation, such a workflow is specified as a directed graph, where connectors and operators are graph nodes and edges reflect the data flow. In yet other implementations, multiple NRT data streams 103 are joined and transformed before being fed to the containers 106 and 108.

Batch processing framework operating in container(s) 108 generates business intelligence using OnLine Analytical Processing (OLAP) queries, which are stored in rich contextual data store 110. In one implementation, events are stored in batch container(s) 108 to act as a backup for raw events on which batch processing jobs can run at any given time. Batch container(s) 108, in some implementations, provides raw counts as well as descriptive statistics such as mean, median and percentile breakdowns. In one implementation, analytics tool like Scalding™ and Pig™ are included in batch container(s) 108 to provide retrospective analysis, machine learning modeling, and other batch analytics. In yet other implementations, batch container(s) 108 is used to correct errors made by the stream container 106 or to handle upgraded capabilities by running analytics on historical data and recompute results. Examples of a batch processing framework include Hadoop distributed file system (HDFS) implementing a MapReduce programming model.

Batch container(s) 108 ingest event tuples from respective input pipelines that collect data for a plurality of NRT data streams. In some implementations, multiple NRT data streams can be assigned to a single pipeline and multiple pipelines can be assigned to a single batch container.

Stream processing framework 200 provides near real-time (NRT) processing of sequences of unbounded events for delivery of immediate analytics and insights based on the events as they are occurring. In one implementation, framework 200 processes one million events per second per node. Framework 200 can be implemented using one or more stream processors like Apache Storm™ and Apache Samza™ or a batch-stream processor such as Apache Spark™. In one implementation, framework 200 includes an API to write jobs that run over a sequence of event-tuples and perform operations over those event-tuples.

Events are ingested into framework 200 by input pipeline 204, which reads data from the data sources 102 and holds events for consumption by the stream container 106. In one implementation, input pipeline 204 is a single delivery endpoint for events entering the container 106. Examples of input pipeline 204 include Apache Kafka™, Kestrel™, Flume™ ActiveMQ™, RabbitMQ™, HTTP/HTTPS servers, UDP sockets, and others. In some implementations, input pipeline 204 includes a listener capable of listening NRT data streams 103 and data flows originating from the data sources 102 by connecting with their respective APIs (e.g., Chatter API, Facebook API (e.g., Open Graph), Twitter API (e.g., Twitter Firehose, Sprinklr, Twitter Search API, Twitter Streaming API), Yahoo API (e.g., Boss) etc.) via the Internet. In some implementations, a listener includes heterogeneous instances responsible for the intake of data from different data sources 102. According to an implementation, the input pipeline 204 can be configured to receive the data over the network(s) using an application protocol layer, or other higher protocol layer, such as HTTP protocol layer, among many possible standard and proprietary protocol layers. These higher protocol layers can encode, package and/or reformat data for sending and receiving messages over a network layer, such as Internet Protocol (IP), and/or a transport layer, such as Transmission Control Protocol (TCP) and/or User Datagram Protocol (UDP).

In a particular implementation, Apache Kafka™ is used as the input pipeline 204. Kafka is a distributed messaging system with a publish and subscribe model. Kafka maintains events in categories called topics. Events are published by so-called producers and are pulled and processed by so-called consumers. As a distributed system, Kafka runs in a cluster, and each node is called a broker, which stores events in a replicated commit log. In other implementations, different messaging and queuing systems can be used.

In one implementation, NRT data streams 103 are queued in input pipeline 204 as batches. In one implementation, a batch is defined as an assemblage of event tuples, also referred to as "units of work", partitioned on a time-slice basis and/or a batch-size basis. A time-slice based definition includes partitioning at least one incoming NRT data stream by its most recently received portion within a time window (e.g., one batch keeps the event tuples from last one second). A batch-size based definition includes partitioning at least one incoming NRT data stream by a most recently received portion limited or restricted to or constrained by a data size (e.g., one batch includes 10 MB of most recently received event tuples). In other implementations, a combination of time-size basis and batch-size basis is used to define batches.

In a particular implementation, Apache Storm™ operates in stream container 106 and performs real-time computation using a matrix of user-submitted directed acyclic graphs, comprised of a network of nodes called "spouts" or "emitters" (collectively referred to as the emitter tier 206 in FIG. 2) and "bolts" or "worker nodes" (collectively referred to as the worker tier 214 in FIG. 2). In a Storm matrix, a spout is the source of NRT data streams 103 and a bolt holds the business logic for analyzing and processing those streams to produce new data as output and passing the output to the next stage in the matrix. In one implementation, a special Kafka Spout emits events read from a Kafka topic as batches to bolts in worker tier 214.

Worker nodes in the worker tier 214 (shown as cubes in FIG. 2) perform various stream processing jobs such as simple data transformation like id to name lookups, up to complex operations such as multi-stream joins. Specifically, worker nodes in the worker tier 214 can perform tasks like aggregations, functions and stream groupings (e.g., shuffle grouping, fields grouping, all grouping, and global grouping), filtering and commits to external persistence layers like rich contextual data store 110. In some implementations, worker nodes in a worker tier 214 have transitive dependencies between related processing stages where upstream stages produce event tuples that are consumed by downstream stages.

The messages passed within stream container 106 are called tuples. A tuple is a set of values for a pre-defined set of fields. Each spout or bolt defines the fields of the tuples it emits statically in advance. All tuples are serialized into a binary form before transmission to other components in the stream container 106. In some implementations, this serialization is handled by a Kryo library, which provides a fast serialization of Java objects.

Stream container 106 allows for parallelization of spouts and bolts using different tuple grouping strategies to pass event streams. The grouping strategy defines the partitioning of an event stream and controls the number of logically parallel threads of the next computational unit—the degree of parallelism refers to the number of parallel executions.

Scheduler 208 tracks one or more input pipelines (e.g., input pipeline 204) in the stream container 106 and schedules execution of batches and any downstream processing stages that depend on the output of an upstream completed processing stage. In one implementation, scheduler 208 assigns a unique batch identifier (ID) to each batch in the input pipeline 204. Further, scheduler 208 triggers either a resend of the current batch or the next batch along with corresponding stage information on a per pipeline basis. Scheduler 208 also sends messages to the coordinator 210 in the form [pipeline:'a',batch:7,stage'b']. In some other implementations, scheduler 208 assigns priority-levels to different pipelines in the IoT platform 100. These priority-levels control execution of a first number of batches from a first pipeline before execution of a second number of batches from a second pipeline.

Coordinator 210 controls dispatch of batches to worker nodes in the worker tier 214. When the scheduler 208 triggers a batch-stage, the coordinator 210 sends triggers to the emitter tier 206 and worker tier 214 who are responsible for that particular stage. When [pipeline:'a',batch:7,stage'b'] is received by the coordinator 210, it contacts two of the hundred available worker nodes. These are the two worker nodes that received input from stage 'a'.

Coordinator 210 also tracks pending units of work in the stream container 106 for a given batch-stage to enable efficient "long-tail" operations where it is likely that a substantial portion of the allocated resources for a process may not be needed for a particular batch. Take a single distributed operation having stage [a] and stage [b] such that the output of stage [a] is used at stage [b], represented as stage [a]→stage [b]. Now, assume that according to one implementation stage [a] runs on hundred worker nodes (each running on a physical node) and stage [b] runs on hundred worker nodes (each running on a physical node) and stage [a] produces output only for two instances of stage [b]. When stage [a] has fully executed and stage [b] begins, the coordinator 210 knows that only two of the hundred worker nodes allocated to stage [b] need to be invoked. Similarly for three stage processing, represented as stage [a]→stage [b]→stage [c], where stage [b] receives no input from stage [a] and therefore stage [c] will also receive no input, coordinator 210 avoids all extraneous communication to stage [b] and stage [c]. In the case of all data in stage [a] being filtered out, there is no communication overhead with the worker nodes allocated to stage [b] and stage [c].

Stream container(s) 106 ingest event tuples from respective input pipelines that collect data for a plurality of NRT data streams. In some implementations, multiple NRT data streams can be assigned to a single pipeline and multiple pipelines can be assigned to a single stream container.

Rich contextual data store 110 stores large volumes of historical data and allows for historical query based analytics that are combined with near real-time analytics. In one implementation, rich contextual data store 110 is used to take a snapshot of tasks in the IoT platform 100 and store state information about the pipelines, spouts, bolts and other elements of the IoT platform 100. In some implementations, rich contextual data store 110 is a NoSQL key-value column store distributed storage system like Apache Cassandra™. Data sent to Cassandra™ is spread out across many nodes or commodity servers C1-C3, connections to which can be made using a Java, Scala, Ruby, Clojure or Python based APIs (e.g., Hector, Pelops, CQL, Thrift, Phpcassa, PyCassa, etc.). Cassandra stores data in units called columns. Each column is a tuple, a list of associated data elements. The basic column format can be represented as (name, value, timestamp). For brevity, the timestamp, while an essential element of the column, is often not written. Thus, an example column may be written (UserName, User-1). An optional level of hierarchy called a super column may incorporate any number of columns. Moving up a level, keys (sometimes referred to as rows) are tuples that include a name and one or more columns or super columns. An example key may be written (Status_Key, (UserName, User-1), (Logged_In, Y). Any number of keys may be grouped into a column family. Analogously, a group of column families is referred to as the keyspace, the final level of hierarchy. Two pseudo code representations of the relationship can be constructed as follows:

[keyspace] [column family] [key] [column]
[keyspace] [column family] [key] [super column] [column]

Output pipeline 218 collects and queues processed events for delivery to a persistent store. In one implementation, data from output pipeline 218 is transmitted concurrently to a SQL data store and NoSQL data store like rich contextual data store 110. Output pipeline 218 can also be hosted by Kafka, which acts a sink for the output of the jobs.

Orchestration

Orchestration 112 includes a web platform that enables non-programmers to construct and run an entity management workflow. Orchestration 112 utilizes a declarative and visual programming model that generates a data entry columnar 114, which accepts declarative and drag-drop input. In one implementation, orchestration 112 allows non-programmers to design their own workflows visually without extensive programming knowledge. In one implementation, orchestration 112 uses a formal declarative description stored in a JSON configuration file. The JSON file defines behaviors used in a session, including states of an entity during a life cycle that specify events to handle, state transition triggers the transition rules to be used, and responsive actions that specify the actions rules to be used, along with other parameters and variables to be used in a workflow. In other implementations, different programming languages like hypertext markup language (HTML), standard generalized markup language (SGML), declarative markup language (DML), extensible markup language (XAML and XML), extensible stylesheet language (XSL), extensible stylesheet language transformations (XSLT), functional programming language like Haskell and ML, logic programming language like Prolog, dataflow programming language like Lucid, rule-based languages like Jess, Lips and CLIPS, and others.

In another implementation, orchestration 112 includes a declarative component and a run-time component. Using the declarative component, a non-programmer declares entity states, transition triggers for the states, responsive actions for the states and other parameters and variables of the entity lifecycle workflow. In one implementation, the declarative component offers existing workflow or workflow excerpts common used by other users and communities. In one implementation, the declarative input is received at a browser in a visual manner rather than a result of writing code. The declarative input is then translated by orchestration 112 into a package of declarative files (e.g., XML) that can be directly executed in the run-time component.

In a further implementation, the run-time component of orchestration 112 includes a translator that interprets the declarative files using relational and XML-native persistent services, gateway, SOAP, REST API and semantic functionalities like machine learning, clustering, classifier-based classification and recommendation, context text analysis, text extraction and modeling, deep linguistic analysis and expressions based alphanumeric pattern detection.

In yet another implementation, orchestration 112 serves as a rule engine and scripting environment for non-declarative languages like Java and C++. In such an implementation, orchestration 112 provides rule-based programming in a high-level procedural or imperative programming language by continuously applying a set of rules to a set of facts. The rules can modify the facts or execute and procedural or imperative code (e.g., Java code). In some implementations, orchestration 112 includes a graphical rule development environment based on an integrated development environment (IDE) providing editor functions, code formatting, error checking, run and debug commands and a graphical debugger.

Orchestration 112 also includes an explorer engine 115, a live dashboard builder engine 116, a morphing engine 117, a tweening engine 118, a tweening stepper 119, an integrated development environment (IDE) 121 and a rendering engine 120.

A disclosed live dashboard builder engine 116 designs dashboards, displaying multiple analytics developed using the explorer engine 115 as real-time data query results. That is, a non-technical user can arrange display charts for multiple sets of query results from the explorer engine 115 on a single dashboard. When a change to a rule-base affects any display chart on the dashboard, the remaining display charts on the dashboard get updated to reflect the change. Accurate live query results are produced and displayed across all display charts on the dashboard.

In one implementation, a real-time query language called "EQL language" is used by orchestration 112 to enable data flows as a means of aligning results. It enables ad hoc analysis of registered event tuples. A non-technical user can specify state definitions, state transition triggers, state transition conditions and state transition actions to change query parameters and can choose different display options, such as a bar chart, pie chart or scatter plot—triggering a real-time change to the display chart—based on a live data query using the updated rule-base. Statements in an EQL script include keywords (such as filter, group, and order), identifiers, literals, or special characters. EQL is declarative; you describe what you want to get from your query. Then, a query engine will decide how to efficiently serve it.

In one implementation, a runtime framework with an event bus handles communication between application(s) 123 running on user computing devices, a query engine (not shown) and an integrated development environment 121, which provides a representation of animated data visualizations implemented in a hierarchy of levels including states, triggers, state transitions, responsive actions, entity activity levels and variations among them over time, real-time event streams, trails of entity transitions from one state to another, and the sizes of the state types based on a number of entities belonging to a particular state type.

Integrated development environment 121 provides a representation of animated data visualizations. Integrated development environment 121 also provides an interface for processing animation scripts that animate transitions between the shapes applied to data visualizations. Example animation transitions include scaling so that charts fit the display environment, and are not clipped; and rotations between vertical and horizontal display. Animation scripts are represented using non-procedural data structures that represent shapes to be rendered, and that represent animations of the transitions between the shapes to be rendered. In one example implementation, JSON can be used to express the generated non-procedural data structures.

Rendering engine 120 transforms non-procedural data structures that represent the shapes and the animation of transitions between the shapes, into rendered graphics.

In other implementations, orchestration 112 may not have the same elements as those listed above and/or may have other/different elements instead of, or in addition to, those listed above.

The output connectors 122 send data from orchestration 112 and/or output pipeline 218 and transform the data into an output format that is consumable by application(s) 123. In one implementation, the output connectors 122 perform full data pushes and/or incremental data pushes from orchestration 112. In another implementation, the output connectors 122 also provide metadata from the orchestration 112. In some implementations, customized output connectors 122 are written using the Connector SDK™ for individual application(s) 123.

Application(s) 123 include components adapted for operating in the IoT platform 100. The IoT platform 100, or an analog, can be provided by a node such as an application server node. Application(s) 123 can include an incoming and outgoing data handler component for receiving and transmitting information from and to the plurality of application server nodes via the network(s).

In an implementation, the application(s) 123 include a data store for storing a plurality of data objects including a plurality of contact records, a plurality of account records, and/or other records (collectively application records). In some implementations, an application record can include, but is not limited to, a tuple corresponding to a user, a file, a folder, an opportunity, an account, an event, and/or any data object. Application(s) 123 can include a data manager component that can be configured to insert, delete, and/or update the records stored in the data store. In addition, application(s) 123 can include a monitoring agent that is configured to monitor activities related to the application records. For example, the monitoring agent can be configured to track a user's post via a public or private social networking service, and/or a user's e-mail client on the user's enterprise desktop computer, and to monitor updates to the contact records, event records, and/or any other application record(s) stored in the data store.

Processed events can additionally be used by application(s) 123, such as Salesforce.com offerings like Sales Cloud™, Data.com™, Service Cloud™, Desk.com™ Marketing Cloud™, Pardot™, Service Cloud™ and Wave Analytics™. For example, processed events can be used to identify opportunities, leads, contacts, and so forth, in the application(s) 123, or can be used to support marketing operations with products such as Radian6™, Buddy Media™ services, and the like. The processed events can also then in turn be used to find these specific users again on these social networks, using matching tools provided by the social network providers. Additionally they could also be layered with specific targeting learned from the aggregation and analysis by the stream container 106 and orchestration 112 respectively.

In an implementation, IoT platform 100 can be located in a cloud computing environment, and may be implemented as a multi-tenant database system. As used herein, the term multi-tenant database system refers to those systems in which various elements of hardware and software of the database system may be shared by one or more tenants. For example, a given application server may simultaneously process requests for a great number of tenants, and a given database table may store rows for multiple tenants.

In some implementations, the elements or components of IoT platform 100 can be engines of varying types including workstations, servers, computing clusters, blade servers, server farms, or any other data processing systems or computing devices. The elements or components can be communicably coupled to the databases via a different network connection. For example, stream container 106 can be coupled via the network(s) (e.g., the Internet), batch container 108 can be coupled via a direct network link, and orchestration 112 can be coupled by yet a different network connection.

In some implementations, databases used in IoT platform 100 can store information from one or more tenants into tables of a common database image to form a multi-tenant database system (MTS). A database image can include one or more database objects. In other implementations, the databases can be relational database management systems (RDBMS), object oriented database management systems (OODBMS), distributed file systems (DFS), no-schema database management systems, or any other data storing systems or computing devices.

While IoT platform 100 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components (e.g., for data communication) can be wired and/or wireless as desired. The different elements or components can be combined into single software modules and multiple software modules can run on the same hardware.

Concurrent and Multiplexed Processing Combination

Figure 3:
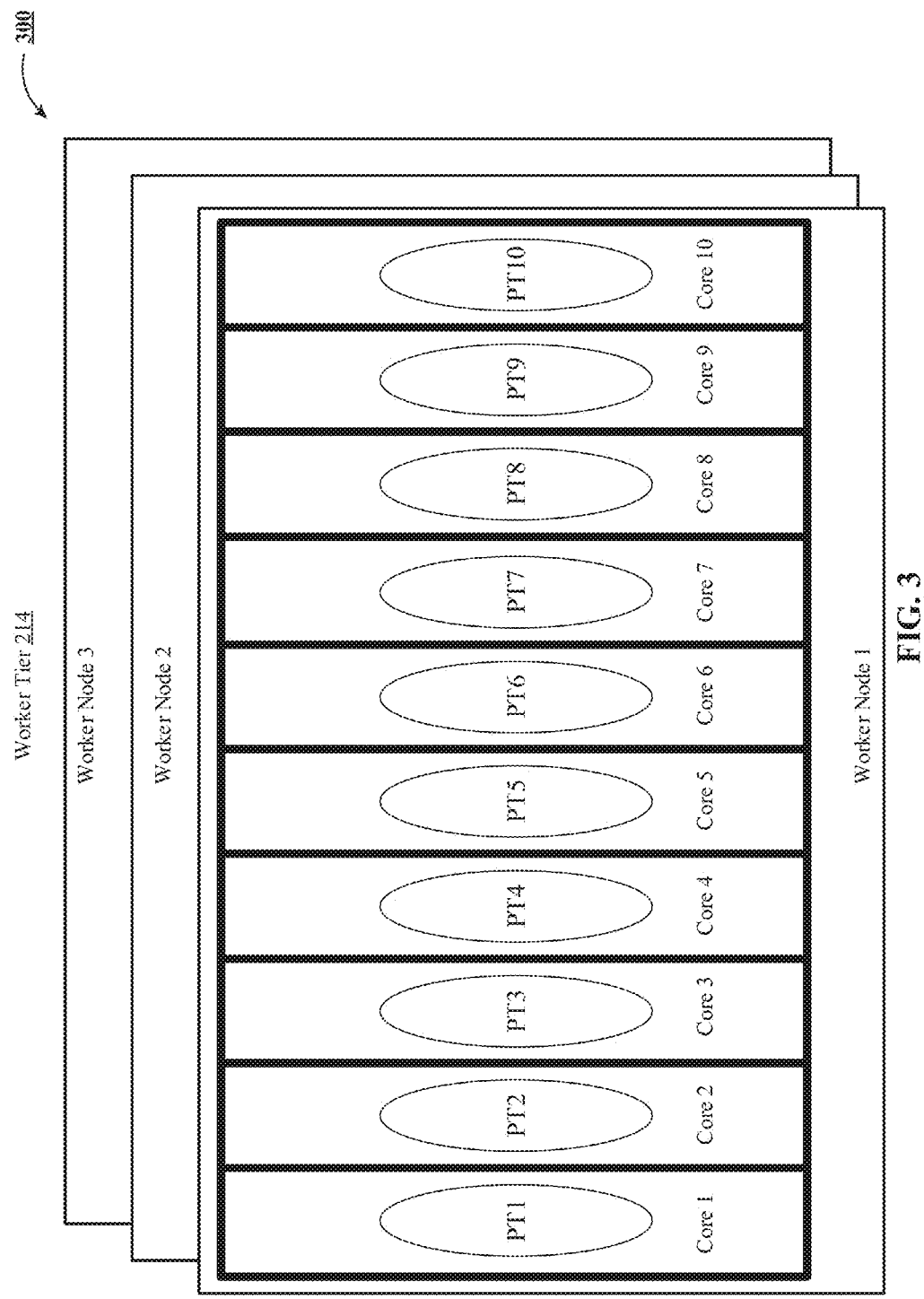
FIG. 3 is one implementation of a worker node in a worker tier that includes a plurality of physical threads utilizing a whole processor core of the worker node.

FIG. 3 is one implementation 300 of worker tier 214 that includes a worker node 1 with a plurality of physical threads PT1-PT10. Each physical thread PT1-PT10 utilizes a whole processor core of the worker node 1 selected from one of the processor cores 1-10. Worker tier 214 also includes worker nodes 2-3, which have their own sets of physical threads, with each physical thread utilizing a whole processor core.

Figure 4A:
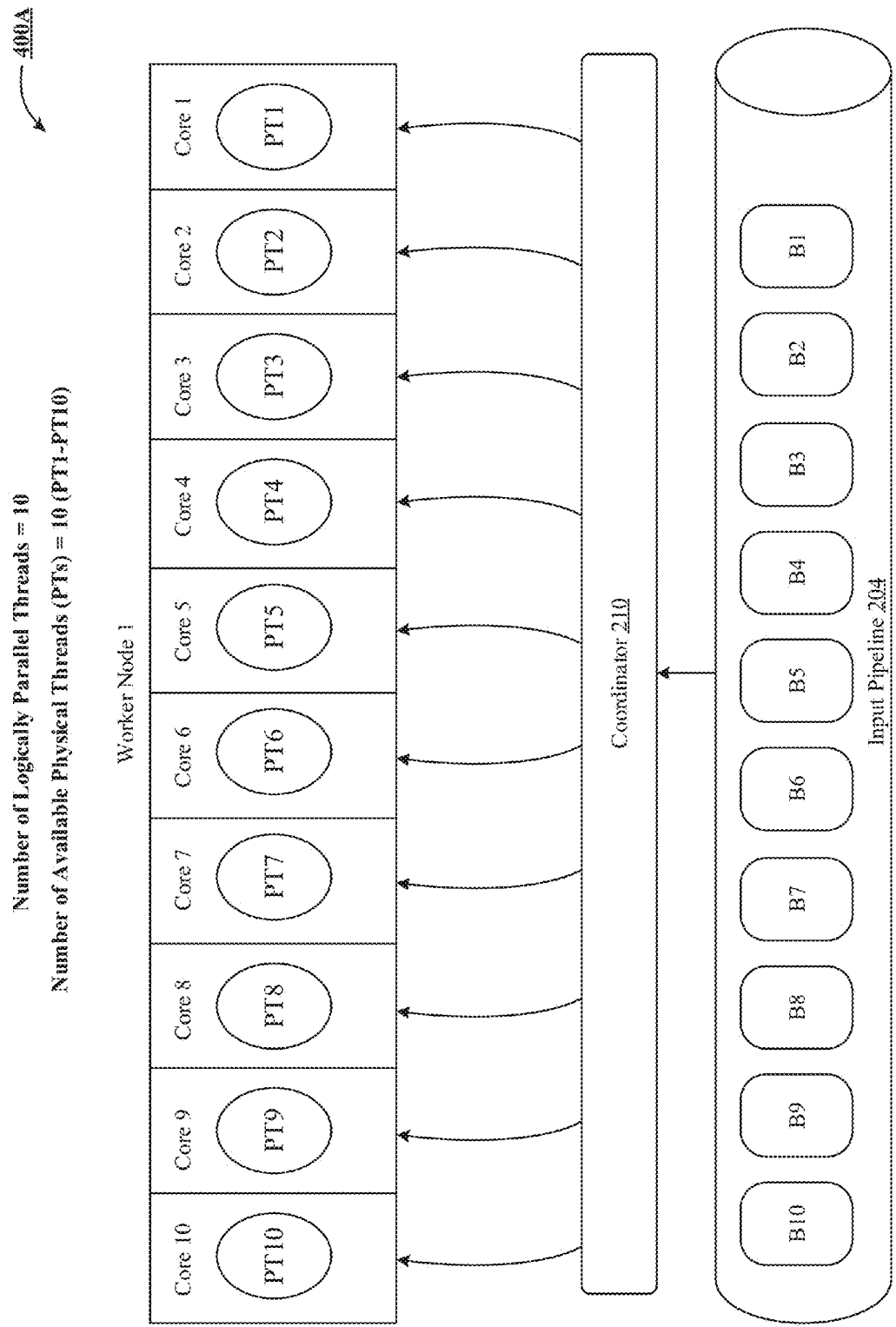
FIG. 4A and FIG. 4B depict one implementation of concurrently processing batches in a pipeline when a count of available physical threads equals or exceeds a set number of logically parallel threads.
Figure 4B:
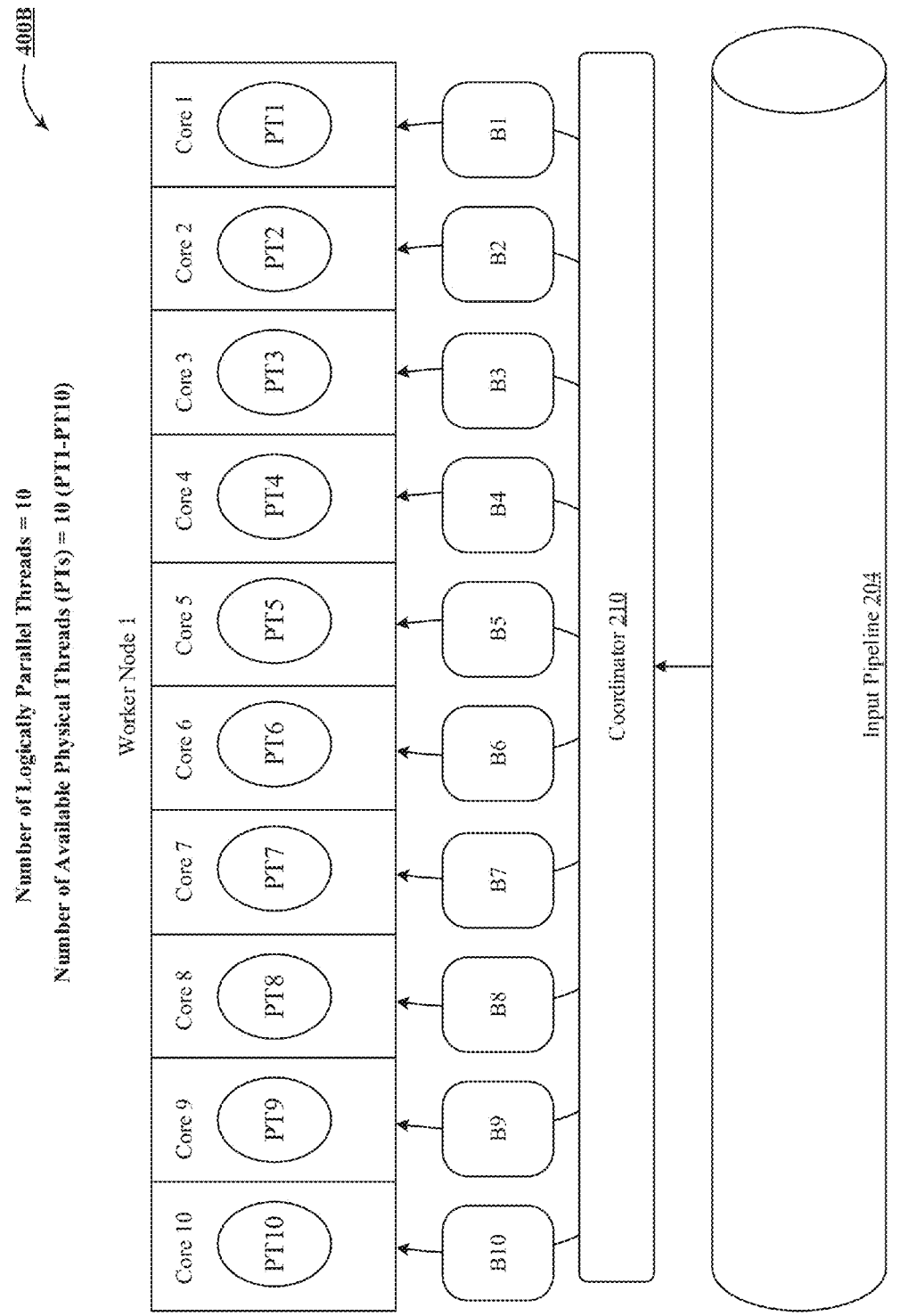

FIG. 4A and FIG. 4B depict one implementation 400A-B of concurrently processing batches in a pipeline when a count of available physical threads equals or exceeds a set number of logically parallel threads. In exemplary scenario illustrated in FIG. 4A, the number of logically parallel threads i.e. degree of parallelism is ten. Also in FIG. 4A, the number of available physical threads is ten i.e. PT1-PT10. Thus, when ten batches B1-10 are queued in input pipeline 204, coordinator 210 concurrently processes the batches B1-B10 at the available ten physical threads PT1-PT10 as shown in FIG. 4B. This concurrent processing 400B occurs because, at run-time, the coordinator determined that the count of available physical threads PT1-PT10 equaled the set number of logically parallel threads (ten).

Figure 5A:
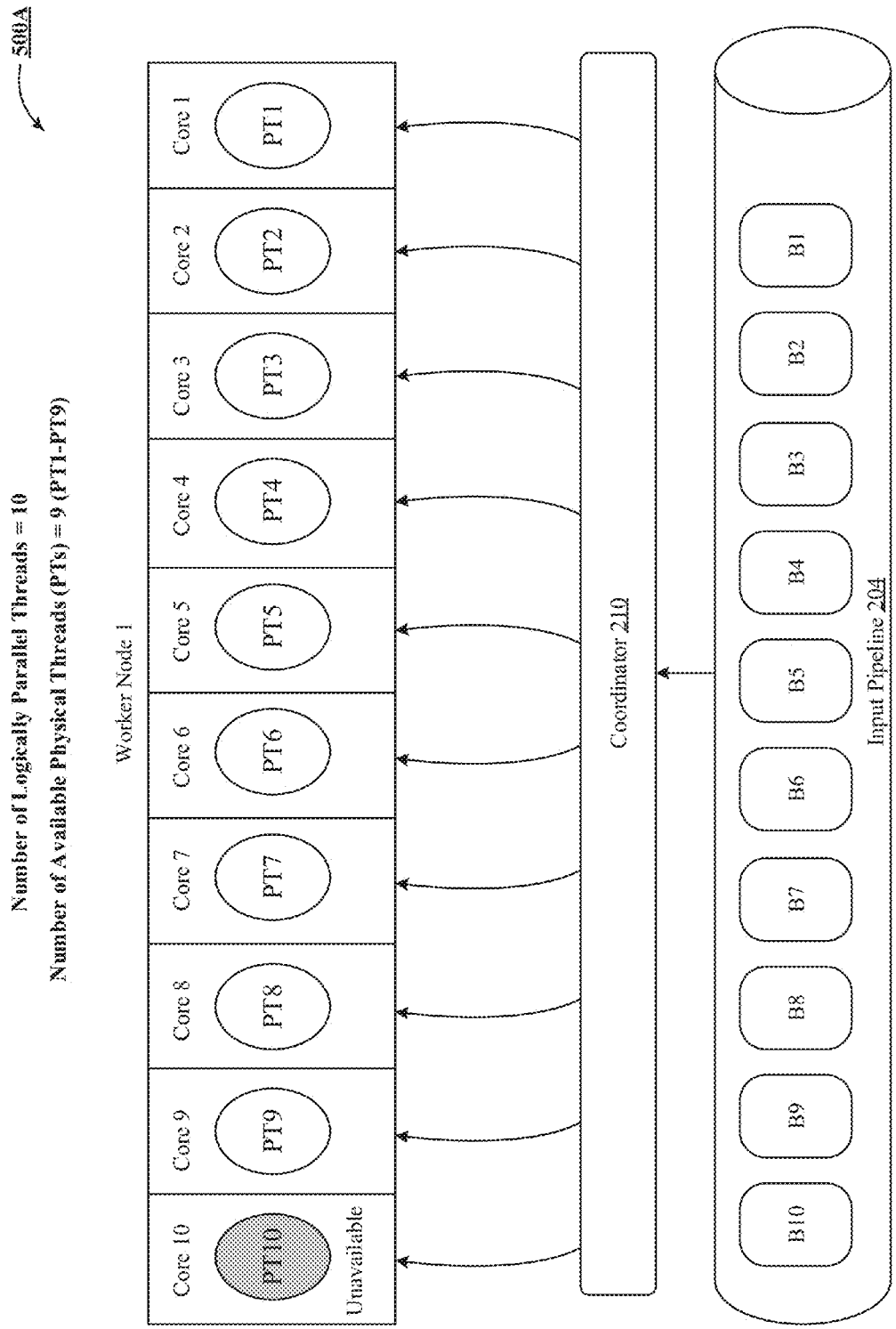
FIG. 5A, FIG. 5B and FIG. 5C show one implementation of multiplexing batches in a pipeline sequentially when there are fewer available physical threads than a set number of logically parallel threads.
Figure 5B:
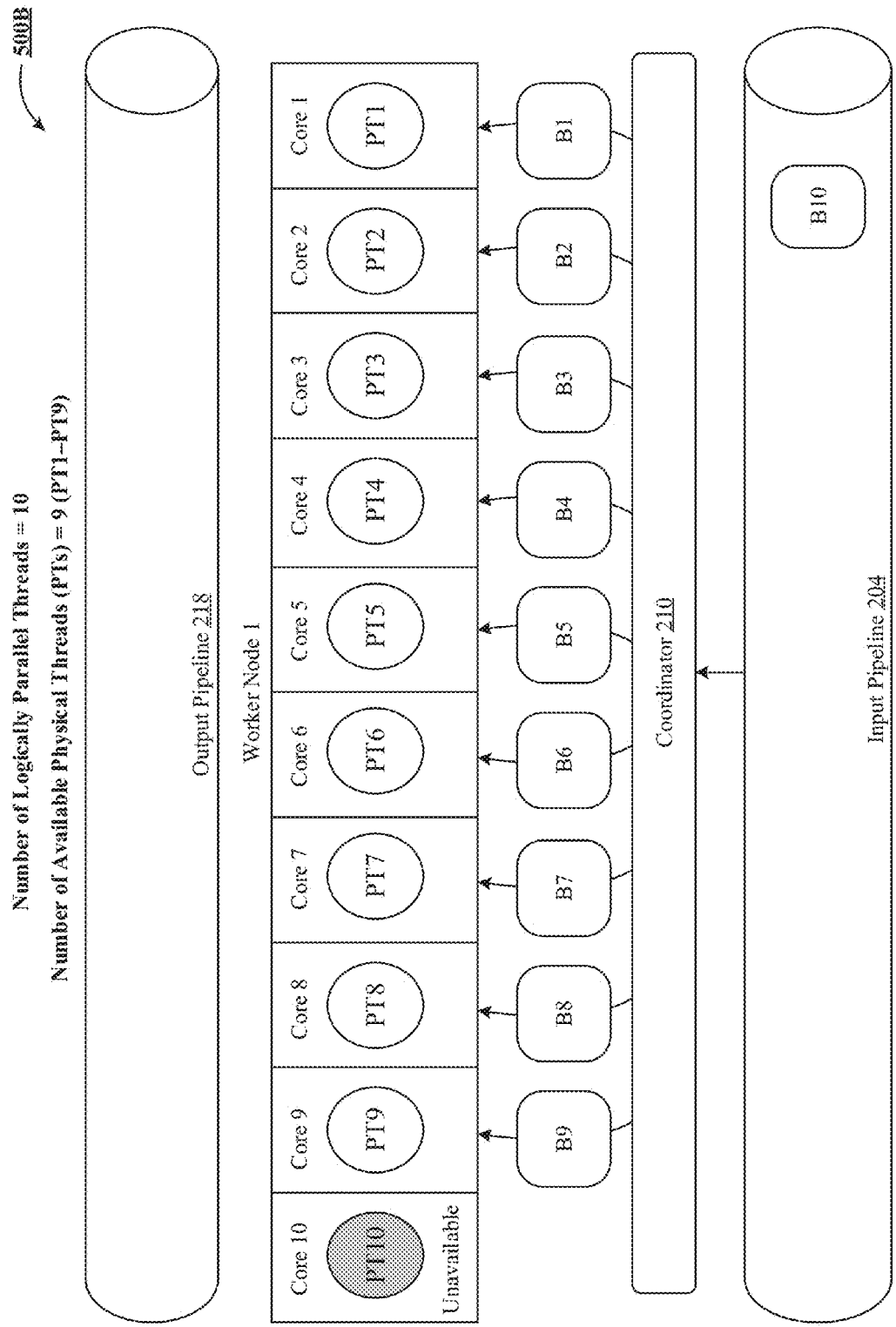
Figure 5C:
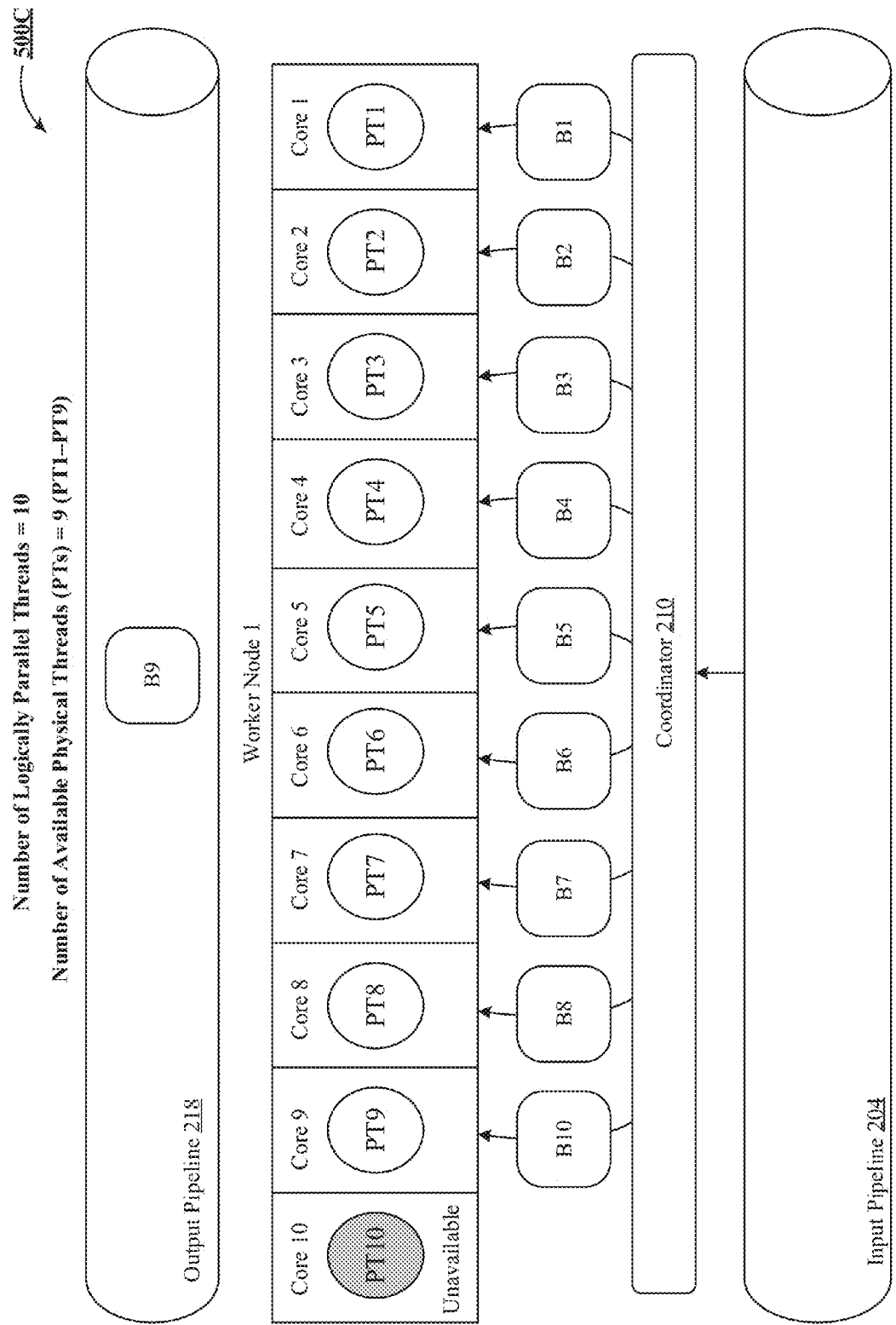

FIG. 5A, FIG. 5B and FIG. 5C show one implementation 500A-C of multiplexing batches B1-10 in a pipeline when there are fewer available physical threads than a set number of logically parallel threads. In exemplary scenario 500A illustrated in FIG. 5A, a set number of logically parallel threads i.e. parallelism is ten. However, the number of available physical threads is only nine i.e. PT1-PT9. The unavailable physical thread PT10 is depicted by a greyed-out box in FIG. 5A, FIG. 5B and FIG. 5C. In some implementations, unavailability refers to that fact that an excessive or equaling thread has not even been initiated, and for such an implementation the unavailable physical thread PT10 would not have been depicted in FIG. 5A, FIG. 5B and FIG. 5C. In other implementations, unavailability refers to the fact that an already initiated physical thread has failed and is not capable of processing batches, as depicted in the exemplary scenario of FIG. 5A, FIG. 5B and FIG. 5C.

The technology disclosed adapts to this discrepancy in the available computation resources PT1-PT10 and the data units B1-B10 to be processed by multiplexing the batches B1-B10 sequentially over the nine available physical threads PT1-PT9. Multiplexing includes concurrently processing batches B1-B9 over the available physical threads PT1-PT9 and when one of the batch (like B9) from batches B1-B9 completes processing by the available physical thread or queues at the output pipeline 218, the next batch B10 in the input pipeline 204 is processed at the next available physical thread (like PT9) by the coordinator 210, as shown in FIG. 5C.

Multi-Stage Processing with Strong Ordering

Figure 6A:
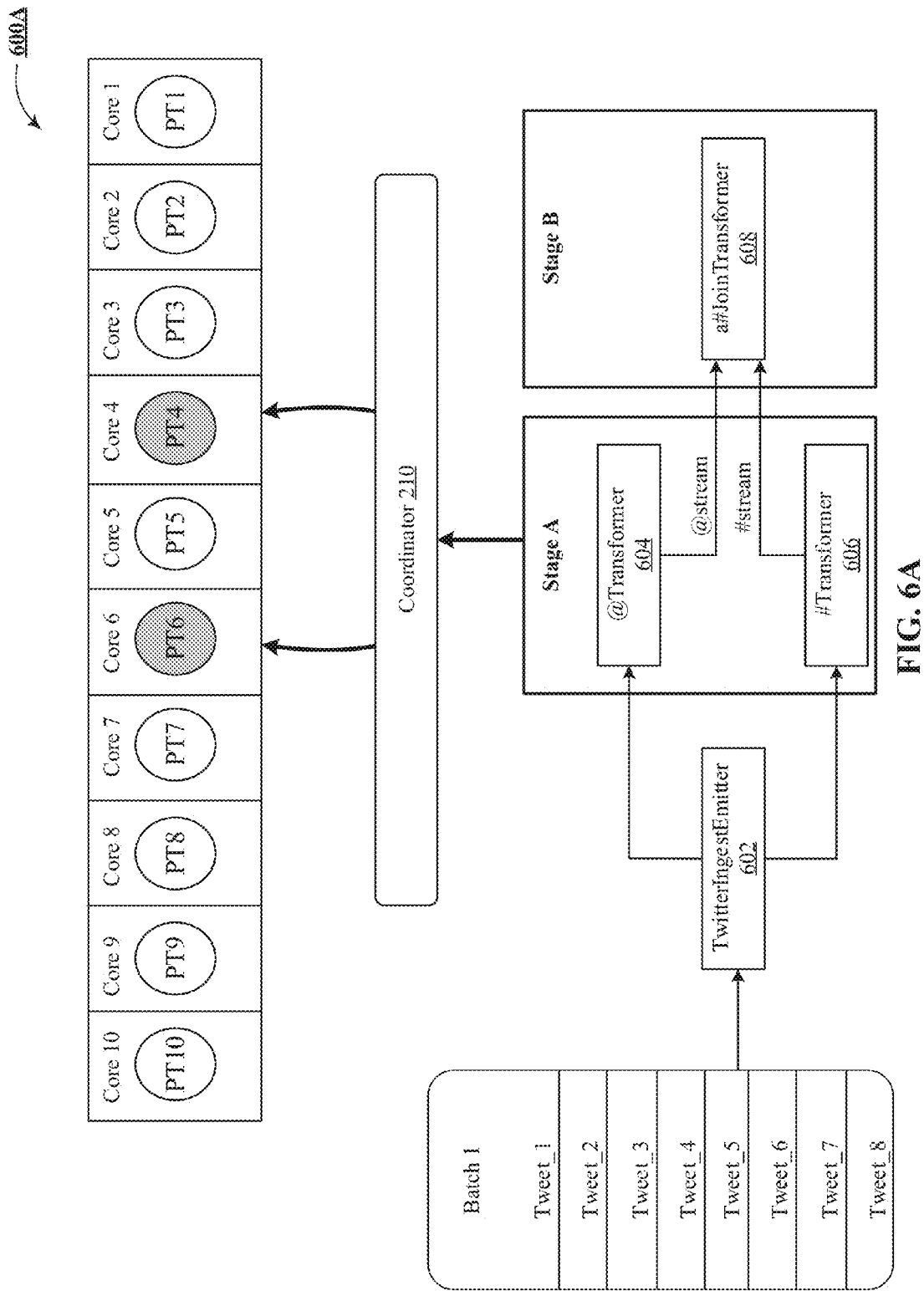
FIG. 6A is one implementation of multi-stage processing of a batch.
Figure 6B:
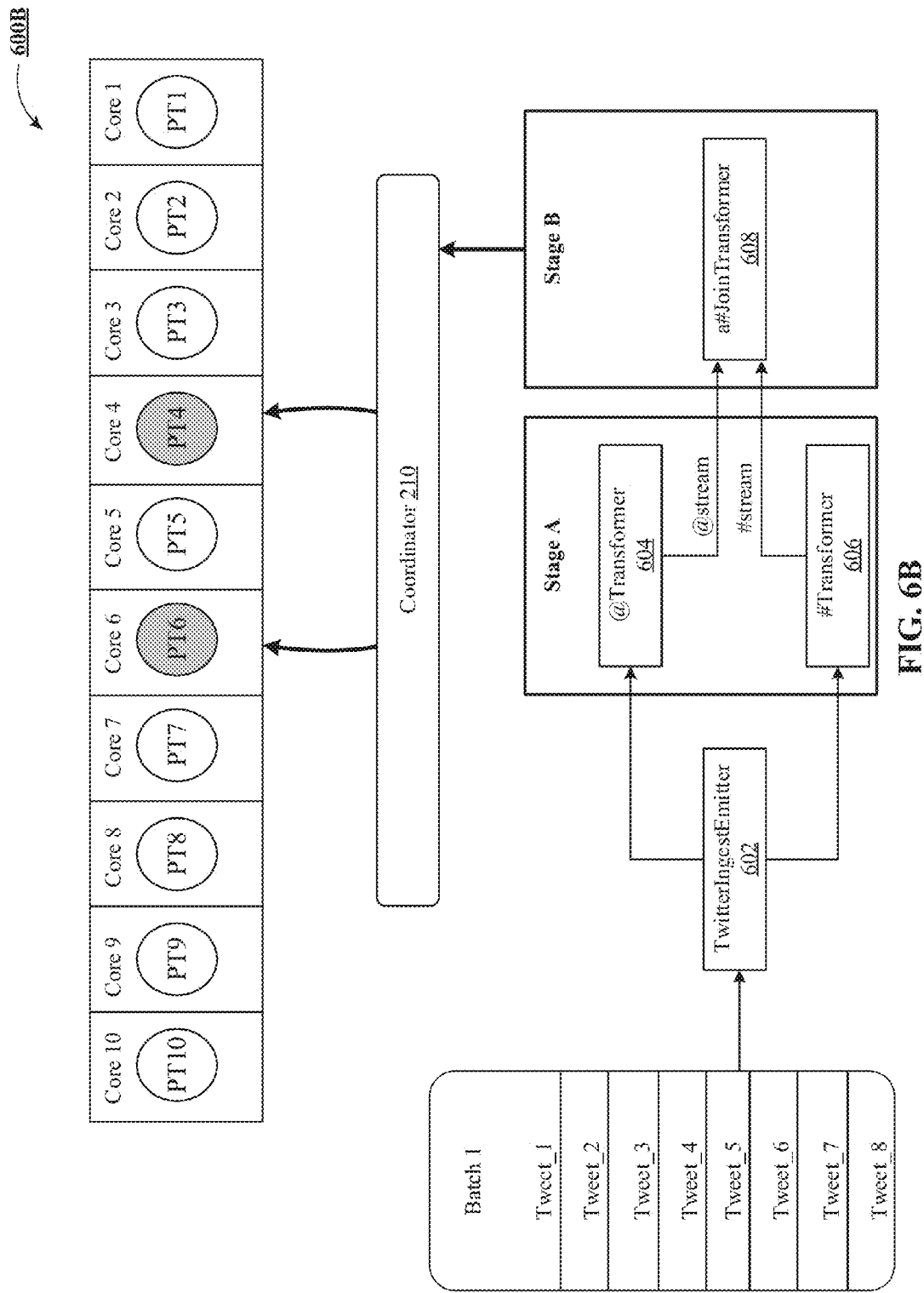
FIG. 6B depicts one implementation of maintaining strong ordering between batch-units of a batch during multi-stage processing of the batch shown in FIG. 6A.

FIG. 6A is one implementation of multi-stage processing 600A of a batch identified as batch 1. The exemplary scenarios in FIG. 6A and FIG. 6B create a Twitter™ analytics tool. During the multi-stage processing 600A, tweets (Tweet_1 to Tweet_8) are stored in batch 1 as individual tuples. These tweets are processed through an emitter 602 and transformers 604, 606 and 608 of a container (not shown). The resulting analytics will list all hashtags in the tweets and their frequency among the tweets, the list of all users and number of tweets they appear in, and a list of users with their hashtags and frequency. Also, the order of the output follows the listing order of the tweets (Tweet_1 to Tweet_8) in batch 1.

The multi-stage processing 600A and 600B is divided into two stages—stage A and stage B. In stage A, a "TwitterIngestEmitter" 602 connects to the Twitter API and emits tweet tuples to the transformers 604, 606 and 608. "@Transformer" 604 parses the tweets and identifies users by looking for words preceded by "@" and sends those words in a stream called "@stream" to "@#JoinTransformer" 608. Also in stage A, a "#Transformer" 606 parses the tweets and looks forwards preceded by "#" and sends those words as a "#stream" to "@#JoinTransformer" 608. For processing stage A, coordinator 210 utilizes physical threads PT4 and PT6, which are greyed-out in FIG. 6A and FIG. 6B. This stage information is stored at scheduler 208, which communicates it to the coordinator 210 at run-time.

In stage B, a "@#JoinTransformer" 608 receives both the streams, @stream and #stream, and counts how many times a hashtag has appeared in a tweet where a user was mentioned. When the stage B is initiated in FIG. 6B, the coordinator 210 identifies that physical threads PT4 and PT6 did the stage A processing and dispatches the streams (@stream and #stream) to be processed at the same physical threads PT4 and PT6 for "@#JoinTransformer" 608.

Furthermore, coordinator 210 maintains a strong ordering in the output by ensuring that both batch-units of batch 1 i.e. @stream and #stream are completely processed in stage A before either one of them is processed by "@#JoinTransformer" 608 in stage B.

Priority Scheduler

Figure 7A:
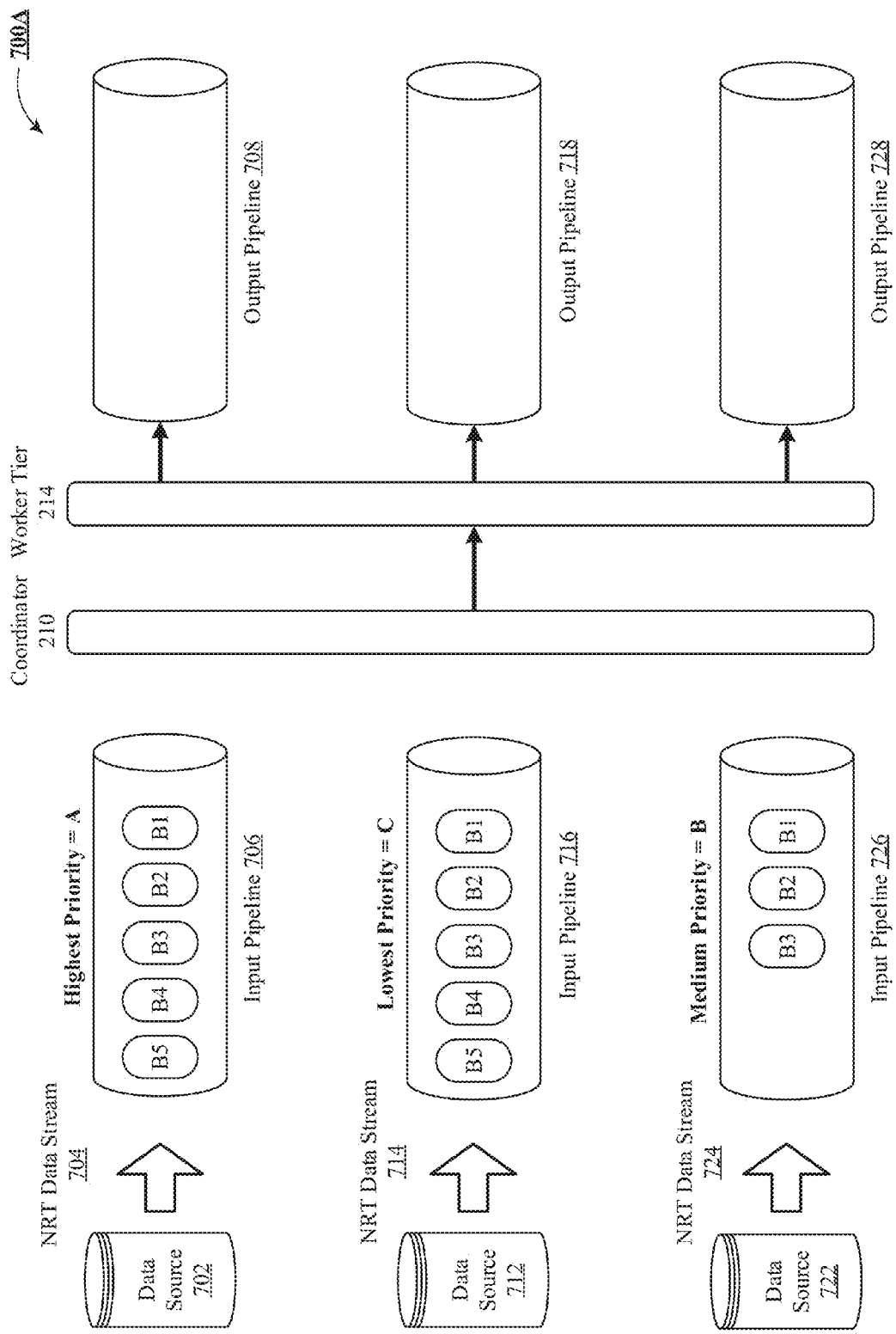
FIG. 7A illustrates one implementation of queuing data from a plurality of NRT data streams as batches in multiple pipelines using a grid-coordinator that controls dispatch of the batches to physical threads running in worker nodes of a worker tier.

FIG. 7A illustrates one implementation of queuing 700A data from a plurality of NRT data streams 704, 714 and 724 as batches in multiple pipelines 706, 716 and 726 using a coordinator 210 that controls dispatch of the batches to physical threads running in worker nodes of a worker tier 214. In FIG. 7C and FIG. 7D, an input pipeline, whose batches are all dispatched, is depicted by a dash-lined visual coding. Also, in FIG. 7B, FIG. 7C and FIG. 7D an input pipeline, whose batches are currently being dispatched, is depicted by a greyed-out visual coding.

In particular, the pipelines 706, 716 and 726 shown in FIG. 7A, FIG. 7B, FIG. 7C and FIG. 7D have different priority levels assigned to them by a grid scheduler 208. NRT data streams 704, 714 and 724 source data from different data sources 702, 712 and 722, which are queued in pipelines 706, 716 and 726 as batches.

Pipelines 706, 716 and 726 can have varying amount of data or number of batches. Moreover, they can have different priority levels. These priority levels can be configured as alphanumeric character ranges such as 1-10 or A-B or X-Z, in one implementation. In another implementation, the priority levels are proportional to the number of batches that will be executed from a higher priority pipeline before execution of a number of batches from a lower priority pipeline. The proportional correlation can be of the order of 10, 100 or another augmentation. For instance, a particular pipeline with a priority level 10 executes 1000 batches before another pipeline with priority level 1 executes 10 batches. In yet another implementation, the priority levels are tied to the processing time such that a particular pipeline with a priority level 10 gets ten times the processing time as another pipeline with priority level 1. In a further implementation, the priority levels are tied to the number of physical threads a pipeline gets processed by within a worker node such that a particular pipeline with a priority level 10 gets ten times the number of physical threads as another pipeline with priority level 1. In a still further implementation, the priority levels are tied to the number of worker nodes a pipeline gets processed by within a worker tier such that a particular pipeline with a priority level 10 gets ten times the number of worker nodes as another pipeline with priority level 1. Other implementations can include using a different correlation model between pipelines that applies programmed processing of multiple pipelines.

Figure 7B:
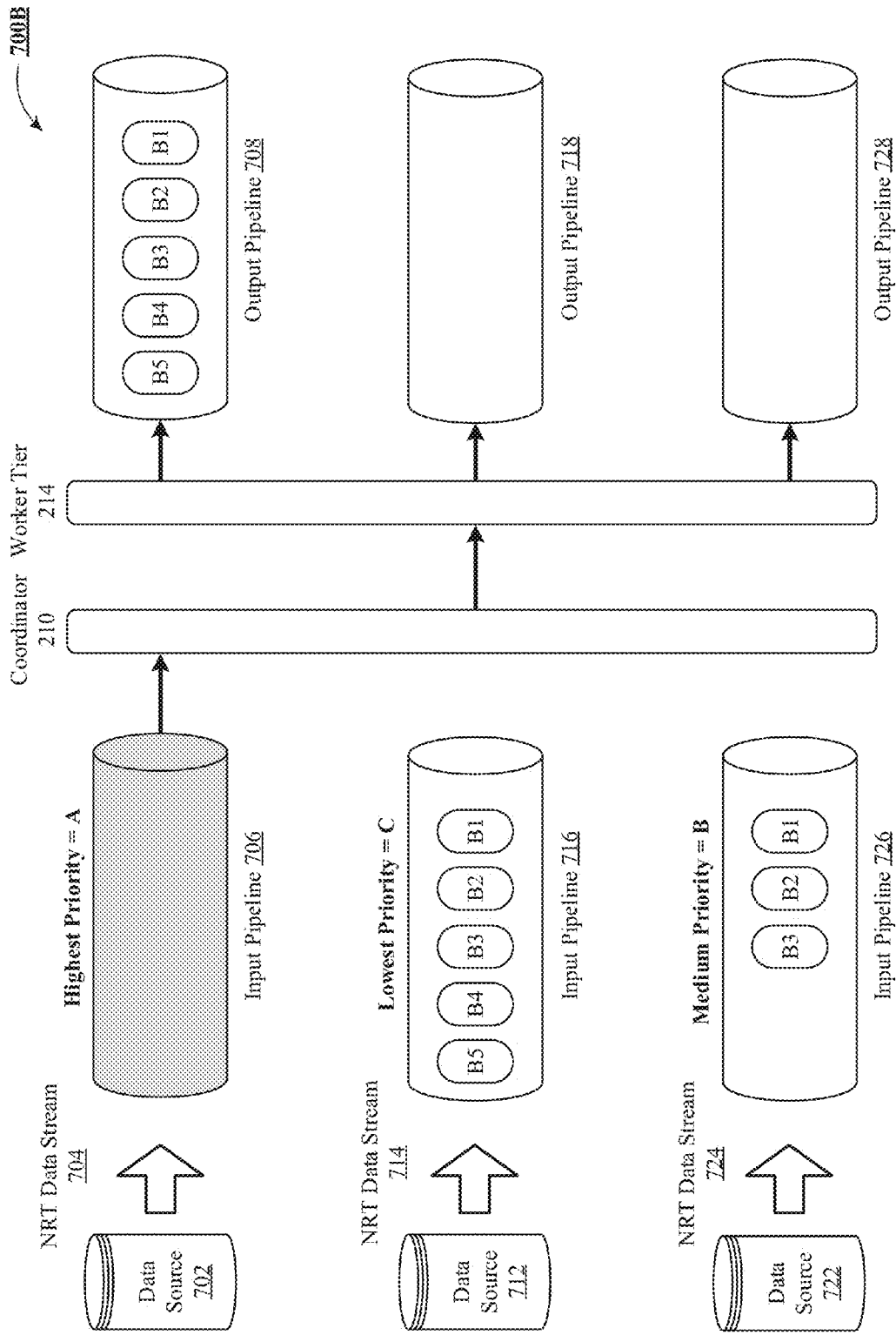
FIG. 7B shows one implementation of executing batches of a highest priority pipeline before other pipelines with medium and low priorities.
Figure 7C:
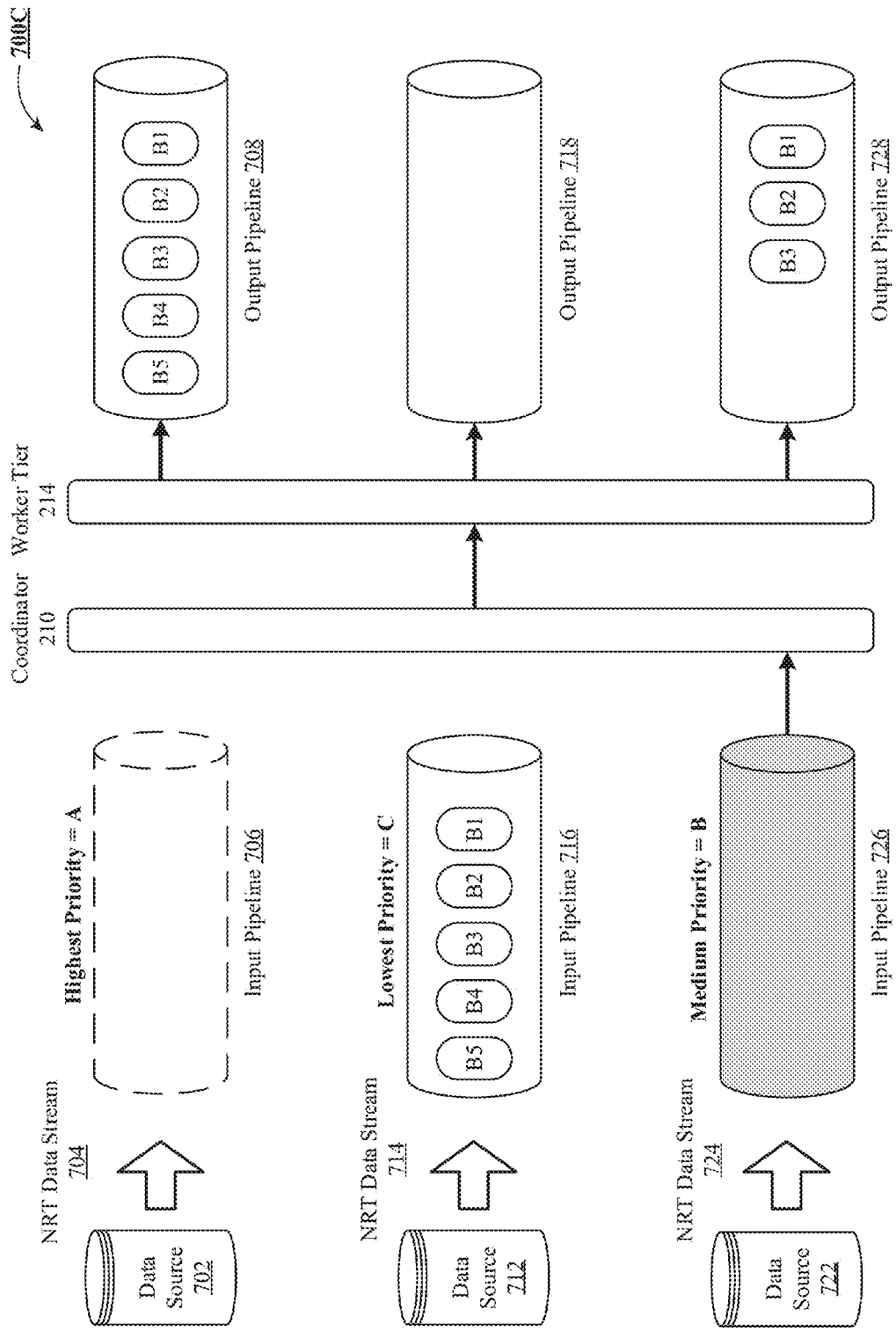
FIG. 7C is one implementation of executing batches of a medium-priority pipeline after a highest priority pipeline but before a low-priority pipeline.
Figure 7D:
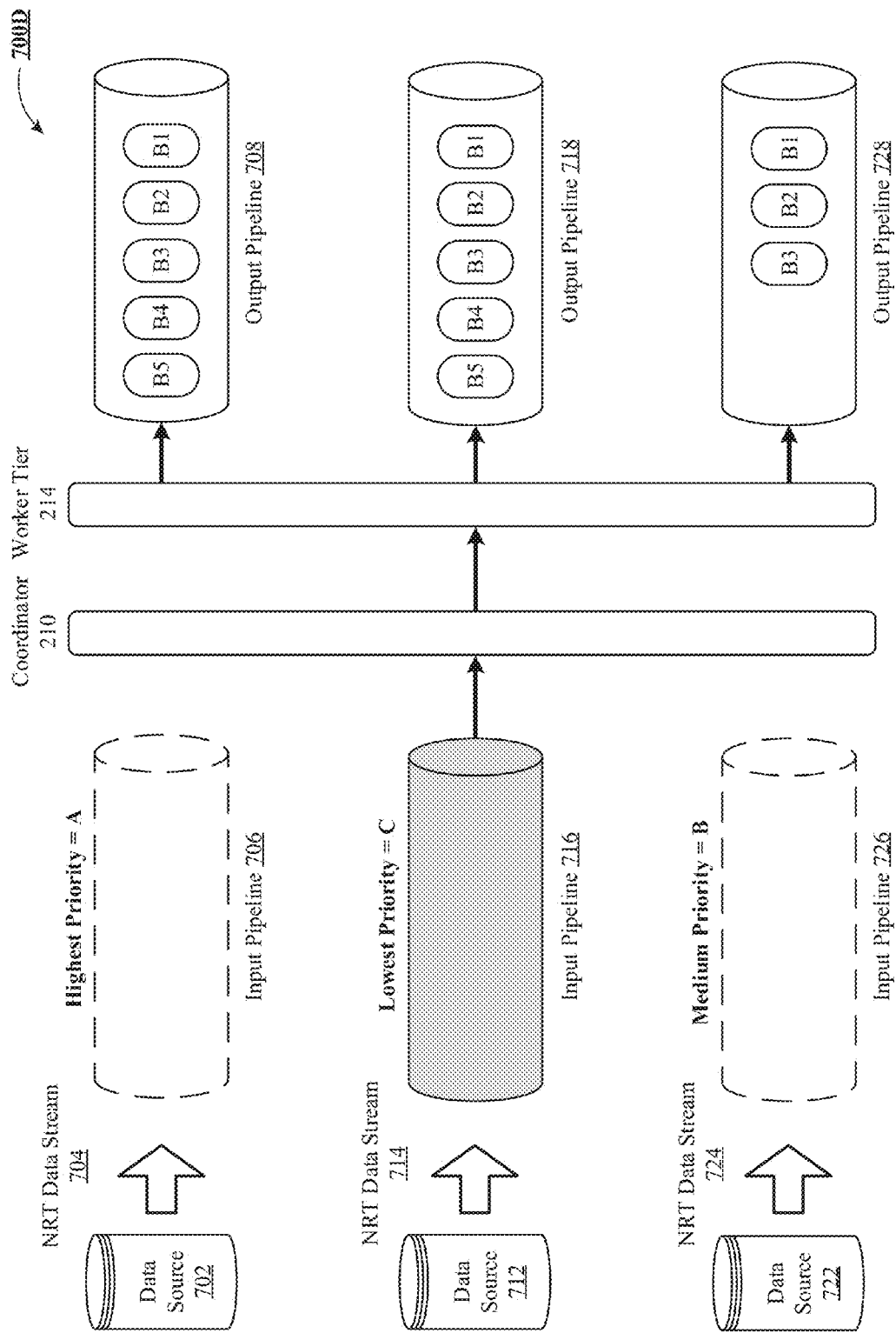
FIG. 7D depicts one implementation of executing batches of a lowest priority pipeline after other pipelines with highest and medium priorities.

FIG. 7B shows one implementation of executing batches 700B of a highest priority pipeline before other pipelines with medium and low priorities. In FIG. 7B, input pipeline 706 has the highest priority A, and thus all of its batches B1-B5 are dispatched by the coordinator 210, processed by the worker tier 214 and queued in the output pipeline 708 before any of the respective batches B1-B3 and B1-B5 of respective input pipelines 726 and 716 with respective priorities B and C are dispatched by the coordinator 210.

FIG. 7C shows one implementation of executing 700C batches of a medium-priority pipeline after a highest priority pipeline but before a low-priority pipeline. In FIG. 7C, the input pipeline 706 with highest priority A has been completely executed and its batches queued in output pipeline 708. Now, all the batches B1-B3 of the input pipeline 726 with medium-priority B are executed before any of the batches of input pipeline 716 with lowest priority C are executed.

FIG. 7D depicts one implementation of executing 700D batches of a lowest priority pipeline after other pipelines with highest and medium priorities. In FIG. 7D, the input pipeline 726 with medium-priority B has been completely executed and its batches queued in output pipeline 728. Now, all the batches B1-B5 of the input pipeline 716 with lowest priority C are executed after input pipeline 726 with medium-priority B is completely executed.

Figure 8A:
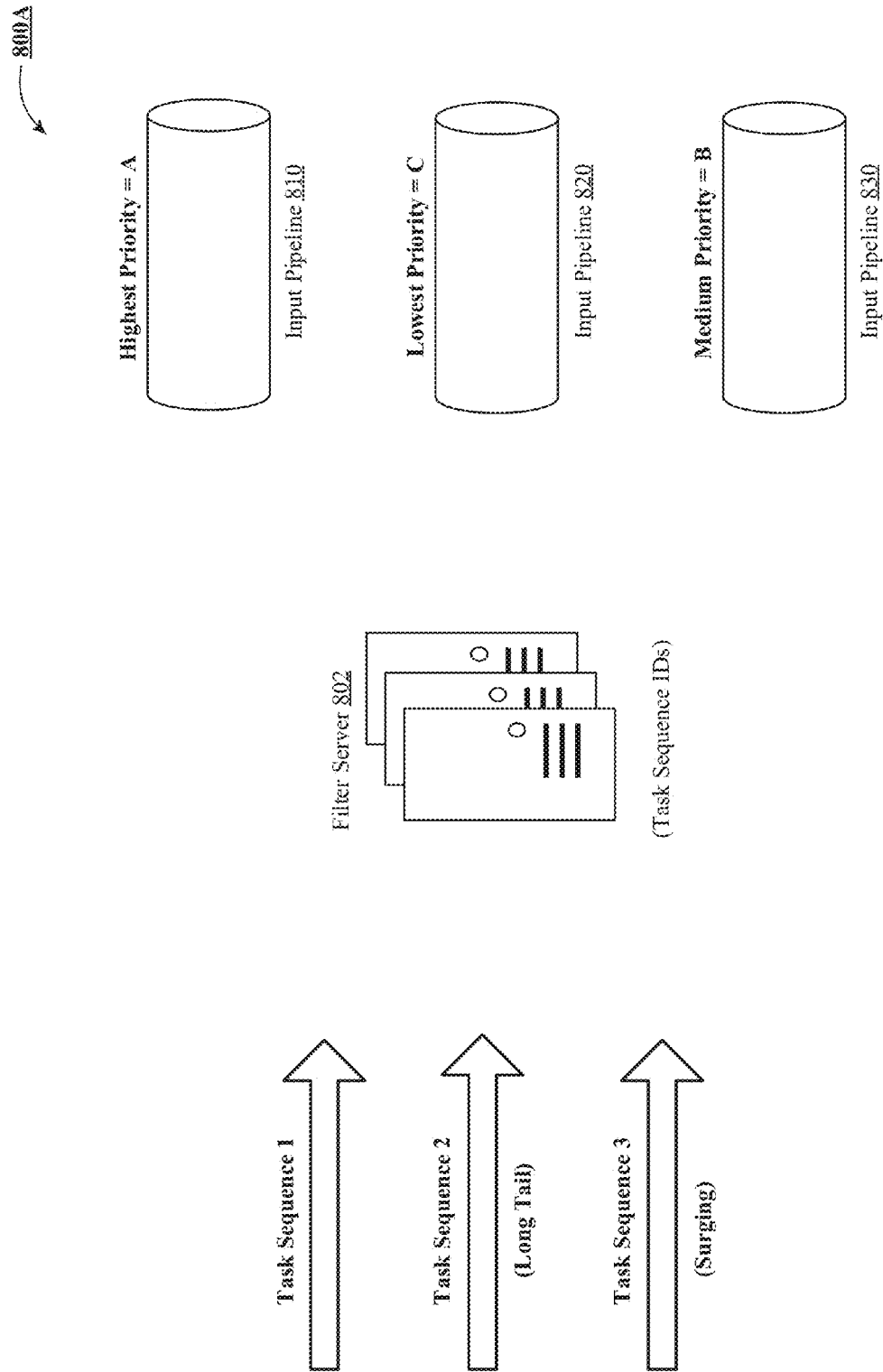
FIG. 8A shows one implementation of tracking NRT data streams using a filter server that detects data belonging to a long tail and surging task sequences based unique task sequence identifiers (IDs).

FIG. 8A shows one implementation of tracking 800A NRT data streams using a filter server 802 that detects data belonging to a long tail task sequence 1 and a surging task sequence 1 based unique task sequence identifiers (IDs) of the respective task sequences. In FIG. 8A, task sequence 1 is a normal task sequence because it has not shown much fluctuation in the amount of data its NRT data stream(s) is emitting. Also in FIG. 8A, task sequence 2 is a long tail task sequence because its NRT data stream(s) is emitting measurably less data than before. Also in FIG. 8A, task sequence 3 is a surging task sequence because its NRT data stream(s) is emitting measurably more data than before.

Furthermore, in FIG. 8A, input pipeline 810 has the highest priority A, input pipeline 830 has the medium-priority B and input pipeline 820 has the lowest priority C.

Figure 8B:
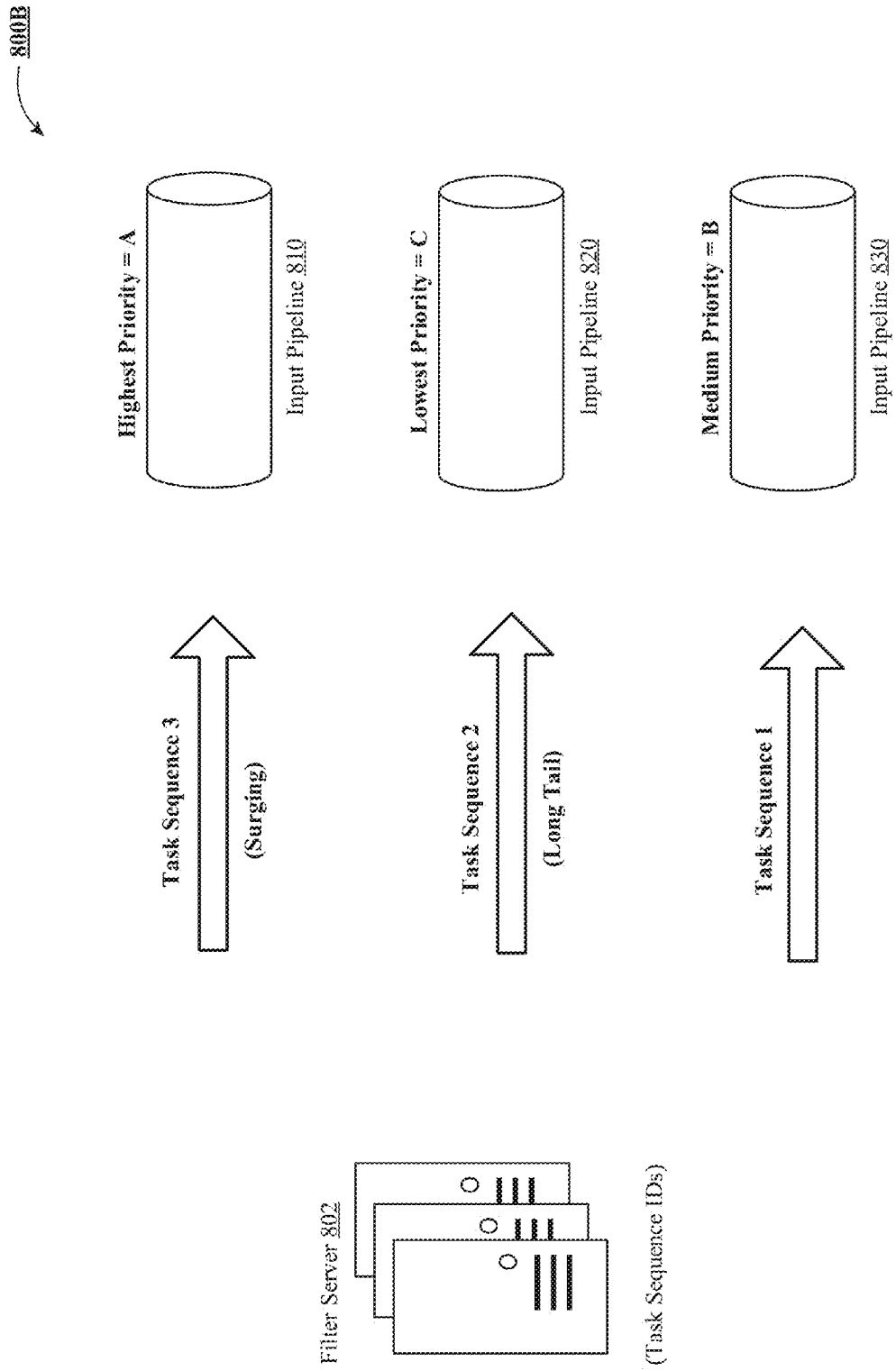
FIG. 8B is one implementation of assigning a long tail task sequence to a low-priority pipeline and assigning a surging task sequence to a high-priority pipeline.

FIG. 8B shows one implementation of assigning 800B, a long tail task sequence, to a low-priority pipeline and assigning a surging task sequence to a high-priority pipeline. In FIG. 8B, surging task sequence 3 is assigned input pipeline 810 with highest priority A because such an assignment ensures that batches of the surging task sequence 3 are processed before and faster than other pipelines. Such a configuration maintains the balanced load in the container and allows for fair allocation of resources to users that need great computational resources because of the high volume of their incoming data.

Also in FIG. 8B, long tail task sequence 2 is assigned input pipeline 820 with lowest priority C because such an assignment ensures that batches of the long tail task sequence 2 are processed at a slow and steady rate. Such a configuration prevents wastage of computation resources and computational time in a container because more physical threads and worker nodes can be allotted to other input pipelines (like input pipeline 810) that have high incoming volumes of data.

Figure 8C:
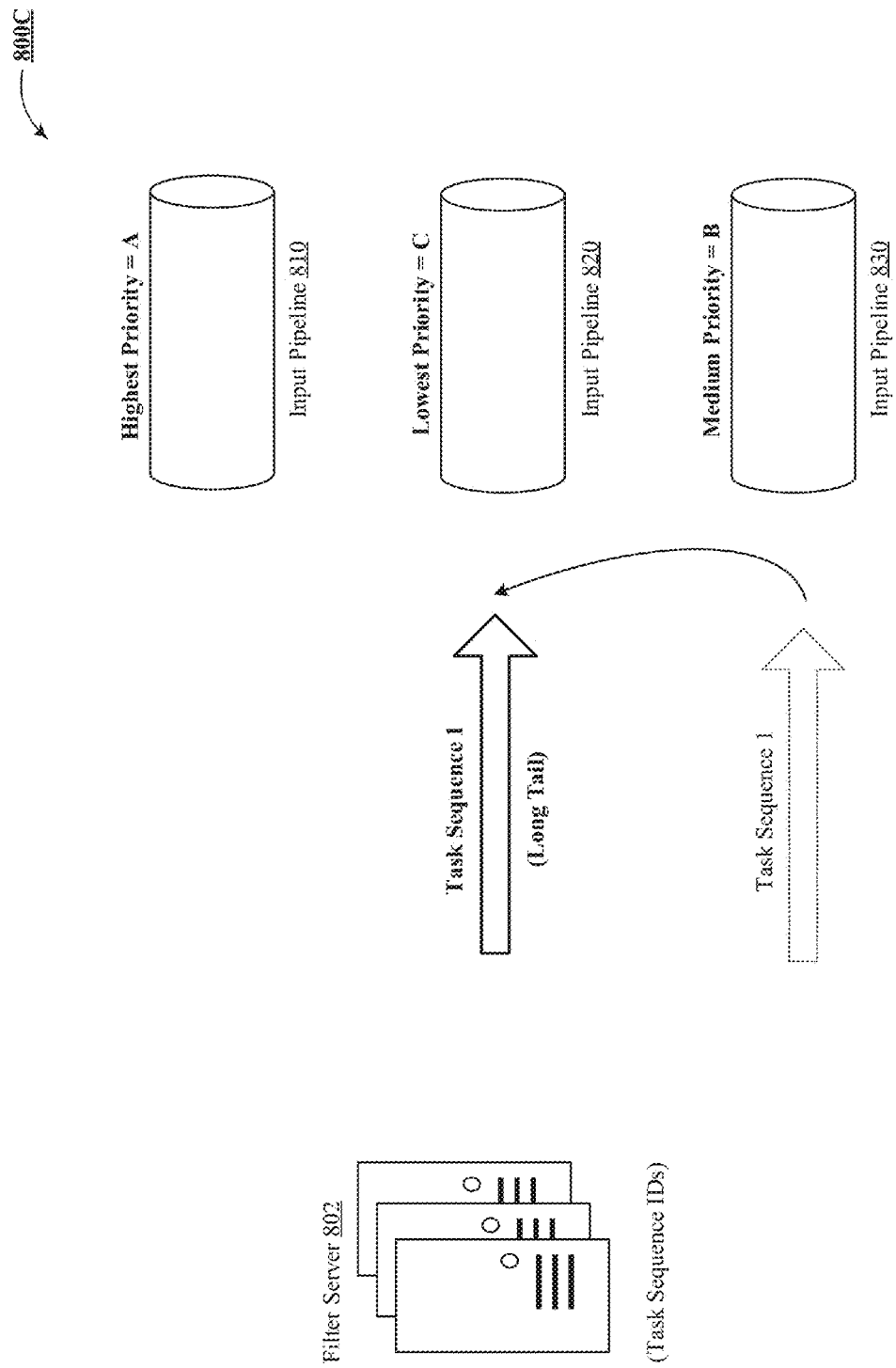
FIG. 8C depicts one implementation of migrating a recently detected long tail task sequence to a lower-priority pipeline.

Also, other components of a container like coordinator 210 and worker nodes are prevented from idle computing that is caused by the long waiting period characteristic of slow incoming data of a long tail task sequence. For example, if a task sequence was initially generating twenty million e-mails per day and is now generating only twenty e-mails per day, then computation resources and computational time for such a long tail tasks sequence are provided to another task sequence by migrating 800C the long tail task sequence to a low-priority pipeline (e.g., input pipeline 820), as shown in FIG. 8C.

Figure 8D:
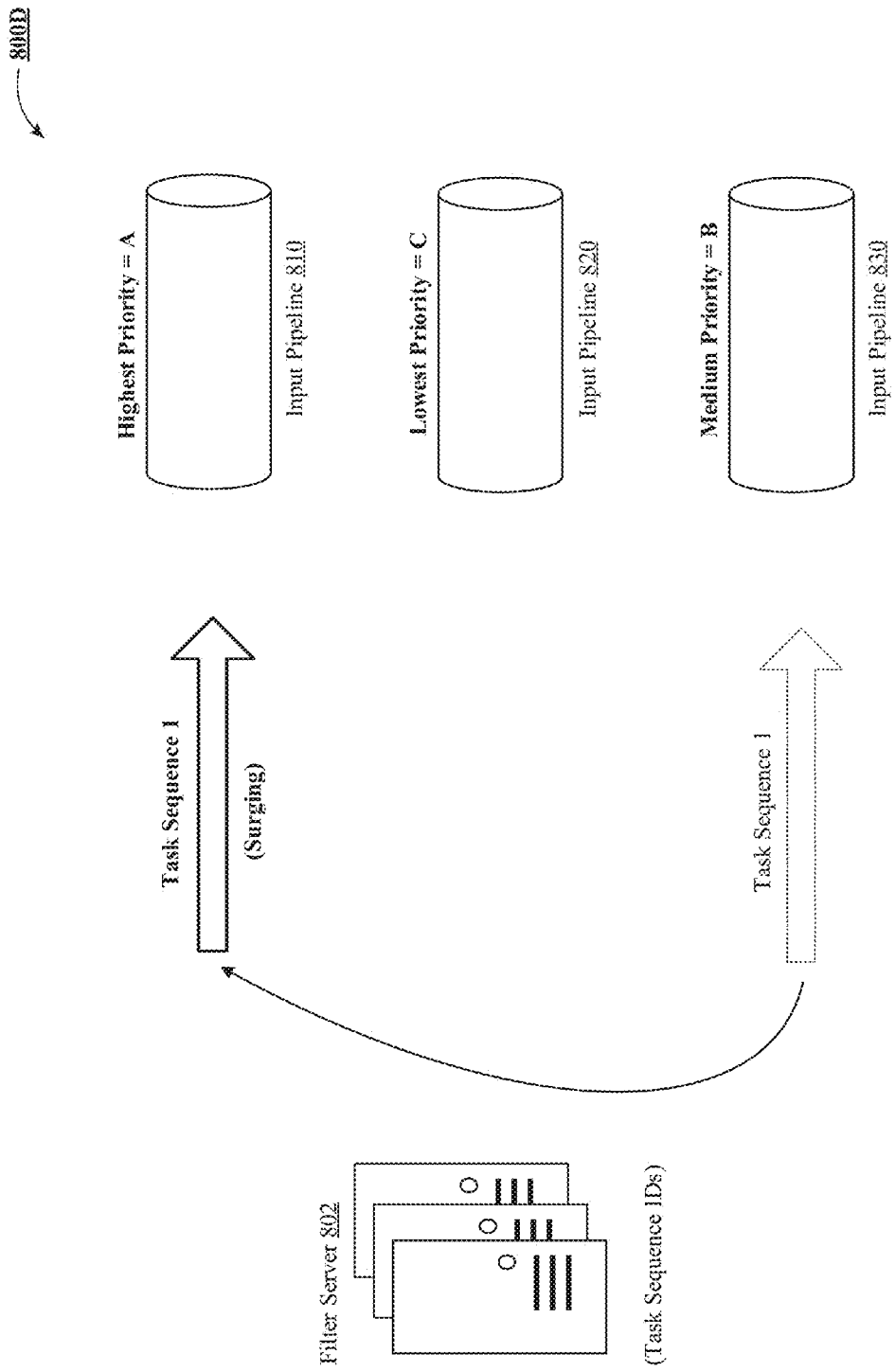
FIG. 8D illustrates one implementation of migrating a recently detected surging task sequence to a higher priority pipeline.

On the other hand, resolution of the shortage of computation resources and computational time for a surging task sequence (e.g., task sequence 1 in FIG. 8D), which previously was a normal task sequence (depicted by dotted lines), is handled by migrating the surging task sequence shown in 800D to a higher priority pipeline (e.g., input pipeline 810), as shown in FIG. 8D.

Multi-Tenant Integration

Figure 9:
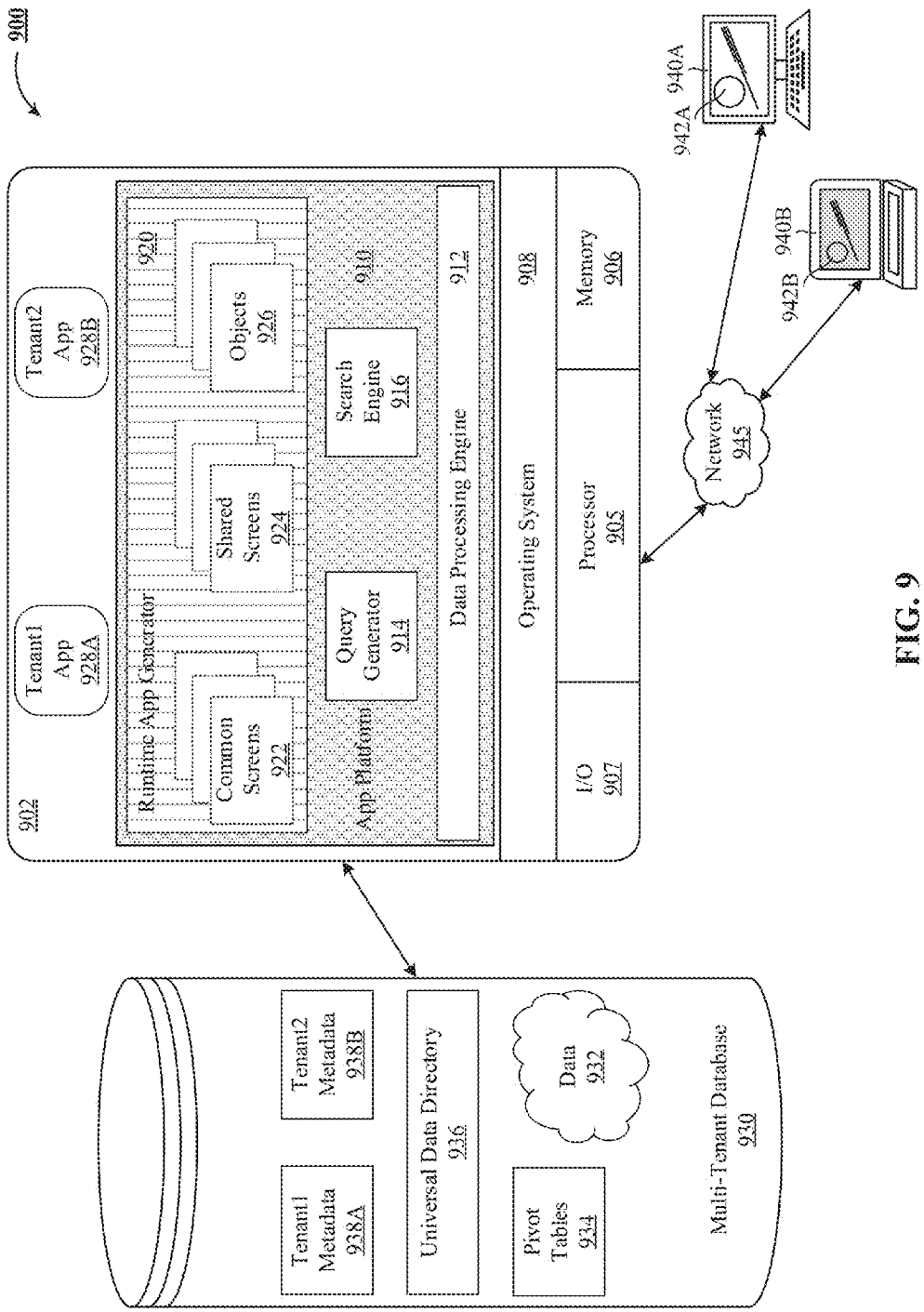
FIG. 9 is a block diagram of an exemplary multi-tenant system suitable for integration with the IoT platform of FIG. 1 in accordance with one or more implementations of the technology disclosed.

FIG. 9 is a block diagram of an exemplary multi-tenant system 900 suitable for integration with in the IoT platform 100 of FIG. 1 in accordance with one or more implementation.

IoT platform 100 of FIG. 1 can be implemented using a multi-tenant system. In that regard, FIG. 9 presents a conceptual block diagram of an exemplary multi-tenant system suitable for integration with the IoT platform 100 of FIG. 1 in accordance with one or more implementations.

In general, the illustrated multi-tenant system 900 of FIG. 9 includes a server 902 that dynamically creates and supports virtual applications 928A and 928B based upon data 932 from a common database 930 that is shared between multiple tenants, alternatively referred to herein as a "multi-tenant database". Data and services generated by the virtual applications 928A and 928B are provided via a network 945 to any number of client devices 940A and 940B, as desired. Virtual applications 928A and 928B are suitably generated at run-time (or on-demand) using a common application platform 910 that securely provides access to the data 932 in the database 930 for each of the various tenants subscribing to the multi-tenant system 900. In accordance with one non-limiting example, the multi-tenant system 900 is implemented in the form of an on-demand multi-tenant user relationship management (CRM) system that can support any number of authenticated users of multiple tenants.

As used herein, a "tenant" or an "organization" refers to a group of one or more users that shares access to common subset of the data within the multi-tenant database 930. In this regard, each tenant includes one or more users associated with, assigned to, or otherwise belonging to that respective tenant. Stated another way, each respective user within the multi-tenant system 900 is associated with, assigned to, or otherwise belongs to a particular tenant of the plurality of tenants supported by the multi-tenant system 900. Tenants may represent users, user departments, work or legal organizations, and/or any other entities that maintain data for particular sets of users within the multi-tenant system 900. Although multiple tenants may share access to the server 902 and the database 930, the particular data and services provided from the server 902 to each tenant can be securely isolated from those provided to other tenants. The multi-tenant architecture therefore allows different sets of users to share functionality and hardware resources without necessarily sharing any of the data 932 belonging to or otherwise associated with other tenants.

The multi-tenant database 930 is any sort of repository or other data storage system capable of storing and managing the data 932 associated with any number of tenants. The database 930 may be implemented using any type of conventional database server hardware. In various implementations, the database 930 shares processing hardware with the server 902. In other implementations, the database 930 is implemented using separate physical and/or virtual database server hardware that communicates with the server 902 to perform the various functions described herein. In an exemplary implementation, the database 930 includes a database management system or other equivalent software capable of determining an optimal query plan for retrieving and providing a particular subset of the data 932 to an instance of virtual application 928A or 928B in response to a query initiated or otherwise provided by a virtual application 928A or 928B. The multi-tenant database 930 may alternatively be referred to herein as an on-demand database, in that the multi-tenant database 930 provides (or is available to provide) data at run-time to on-demand virtual applications 928A and 928B generated by the application platform 910.

In practice, the data 932 may be organized and formatted in any manner to support the application platform 910. In various implementations, the data 932 is suitably organized into a relatively small number of large data tables to maintain a semi-amorphous "heap"-type format. The data 932 can then be organized as needed for a particular virtual application 928A or 928B. In various implementations, conventional data relationships are established using any number of pivot tables 934 that establish indexing, uniqueness, relationships between entities, and/or other aspects of conventional database organization as desired. Further data manipulation and report formatting is generally performed at run-time using a variety of metadata constructs. Metadata within a universal data directory (UDD) 936, for example, can be used to describe any number of forms, reports, workflows, user access privileges, work logic and other constructs that are common to multiple tenants. Tenant-specific formatting, functions and other constructs may be maintained as tenant-specific metadata 938A- and 938B for each tenant, as desired. Rather than forcing the data 932 into an inflexible global structure that is common to all tenants and applications, the database 930 is organized to be relatively amorphous, with the pivot tables 934 and the metadata 938A and 938B providing additional structure on an as-needed basis. To that end, the application platform 910 suitably uses the pivot tables 934 and/or the metadata 938A and 938B to generate "virtual" components of the virtual applications 928A and 928B to logically obtain, process, and present the relatively amorphous data 932 from the database 930.

The server 902 is implemented using one or more actual and/or virtual computing systems that collectively provide the dynamic application platform 910 for generating the virtual applications 928A and 928B. For example, the server 902 may be implemented using a cluster of actual and/or virtual servers operating in conjunction with each other, typically in association with conventional network communications, cluster management, load balancing and other features as appropriate. The server 902 operates with any sort of conventional processing hardware, such as a processor 905, memory 906, input/output features 907 and the like. The input/output features 907 generally represent the interface(s) to networks (e.g., to the network 945, or any other local area, wide area or other network), mass storage, display devices, data entry devices and/or the like. The processor 905 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 906 represents any non-transitory short or long term storage or other computer-readable media capable of storing programming instructions for execution on the processor 905, including any sort of random access memory (RAM), read only memory (ROM), flash memory, magnetic or optical mass storage, and/or the like. The computer-executable programming instructions, when read and executed by the server 902 and/or processor 905, cause the server 902 and/or processor 705 to create, generate, or otherwise facilitate the application platform 910 and/or virtual applications 928A and 928B and perform one or more additional tasks, operations, functions, and/or processes described herein. It should be noted that the memory 906 represents one suitable implementation of such computer-readable media, and alternatively or additionally, the server 902 could receive and cooperate with external computer-readable media that is realized as a portable or mobile component or application platform, e.g., a portable hard drive, a USB flash drive, an optical disc, or the like.

The application platform 910 is any sort of software application or other data processing engine that generates the virtual applications 928A and 928B that provide data and/or services to the client devices 940A and 940B. In a typical implementation, the application platform 910 gains access to processing resources, communications interfaces and other features of the processing hardware 904 using any sort of conventional or proprietary operating system 908. The virtual applications 928A and 928B are typically generated at run-time in response to input received from the client devices 940A and 940B. For the illustrated implementation, the application platform 910 includes a bulk data processing engine 912, a query generator 914, a search engine 916 that provides text indexing and other search functionality, and a runtime application generator 920. Each of these features may be implemented as a separate process or other module, and many equivalent implementations could include different and/or additional features, components or other modules as desired.

The runtime application generator 920 dynamically builds and executes the virtual applications 928A and 928B in response to specific requests received from the client devices 940A and 940B. The virtual applications 928A and 928B are typically constructed in accordance with the tenant-specific metadata 938, which describes the particular tables, reports, interfaces and/or other features of the particular application 928A and 928B. In various implementations, each virtual application 928A and 928B generates dynamic web content that can be served to a browser or other client programs 942A and 942B associated with its client device 940A and 940B, as appropriate.

The runtime application generator 920 suitably interacts with the query generator 914 to efficiently obtain multi-tenant data 932 from the database 930 as needed in response to input queries initiated or otherwise provided by users of the client devices 940A and 940B. In a typical implementation, the query generator 914 considers the identity of the user requesting a particular function (along with the user's associated tenant), and then builds and executes queries to the database 930 using system-wide metadata within a universal data directory (UDD) 936, tenant specific metadata 938, pivot tables 934, and/or any other available resources. The query generator 914 in this example therefore maintains security of the common database 930 by ensuring that queries are consistent with access privileges granted to the user and/or tenant that initiated the request. In this manner, the query generator 914 suitably obtains requested subsets of data 932 accessible to a user and/or tenant from the database 930 as needed to populate the tables, reports or other features of the particular virtual application 928A or 928B for that user and/or tenant.

Still referring to FIG. 9, the data processing engine 912 performs bulk processing operations on the data 932 such as uploads or downloads, updates, online transaction processing, and/or the like. In many implementations, less urgent bulk processing of the data 932 can be scheduled to occur as processing resources become available, thereby giving priority to more urgent data processing by the query generator 914, the search engine 916, the virtual applications 928A and 928B, etc.

In exemplary implementations, the application platform 910 is utilized to create and/or generate data-driven virtual applications 928A and 928B for the tenants that they support. Such virtual applications 928A and 928B may make use of interface features such as custom (or tenant-specific) screens 924, standard (or universal) screens 922 or the like. Any number of custom and/or standard objects 926 may also be available for integration into tenant-developed virtual applications 928A and 928B. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. The data 932 associated with each virtual application 928A and 928B is provided to the database 930, as appropriate, and stored until it is requested or is otherwise needed, along with the metadata 938 that describes the particular features (e.g., reports, tables, functions, objects, fields, formulas, code, etc.) of that particular virtual application 928A and 928B. For example, a virtual application 928A and 928B may include a number of objects 926 accessible to a tenant, wherein for each object 926 accessible to the tenant, information pertaining to its object type along with values for various fields associated with that respective object type are maintained as metadata 938 in the database 930. In this regard, the object type defines the structure (e.g., the formatting, functions and other constructs) of each respective object 926 and the various fields associated therewith.

With continued reference to FIG. 9, the data and services provided by the server 902 can be retrieved using any sort of personal computer, mobile telephone, tablet or other network-enabled client device 940A or 940B on the network 945. In an exemplary implementation, the client device 940A or 940B includes a display device, such as a monitor, screen, or another conventional electronic display capable of graphically presenting data and/or information retrieved from the multi-tenant database 930. Typically, the user operates a conventional browser application or other client program 942 executed by the client devices 940A and 940B to contact the server 902 via the network 945 using a networking protocol, such as the hypertext transport protocol (HTTP) or the like. The user typically authenticates his or her identity to the server 902 to obtain a session identifier ("SessionID") that identifies the user in subsequent communications with the server 902. When the identified user requests access to a virtual application 928A or 928B, the runtime application generator 920 suitably creates the application at run time based upon the metadata 938, as appropriate. As noted above, the virtual application 928A or 928B may contain Java, ActiveX, or other content that can be presented using conventional client software running on the client device 940A or 940B; other implementations may simply provide dynamic web or other content that can be presented and viewed by the user, as desired.

The foregoing description is merely illustrative in nature and is not intended to limit the implementations of the subject matter or the application and uses of such implementations. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary implementations described herein are not intended to limit the scope or applicability of the subject matter in any way.

For the sake of brevity, conventional techniques related to databases, social networks, user interfaces, and other functional aspects of the systems (and the individual operating components of the systems) may not be described in detail herein. In addition, those skilled in the art will appreciate that implementations may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Implementations of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an implementation of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary implementations, the subject matter described herein is implemented in conjunction with a virtual user relationship management (CRM) application in a multi-tenant environment.

Leveraging Common Container Dependencies

The technology disclosed reduces the amount of dedicated hardware and clients required to connect multiple pipelines in a container to common resources. For example, if thousand pipelines are processed over hundred worker nodes in a container, then at least ten connections are needed to be configured with relevant container resources such as a message bus (like Apache Kafka™), an output queue or sink (like Apache Kafka™), a persistence store (like Apache Cassandra™) and a global service registry (Zookeeper™). Thus, in total, for such a container, a thousand connections need to be made to each of the different relevant resources.

Figure 10:
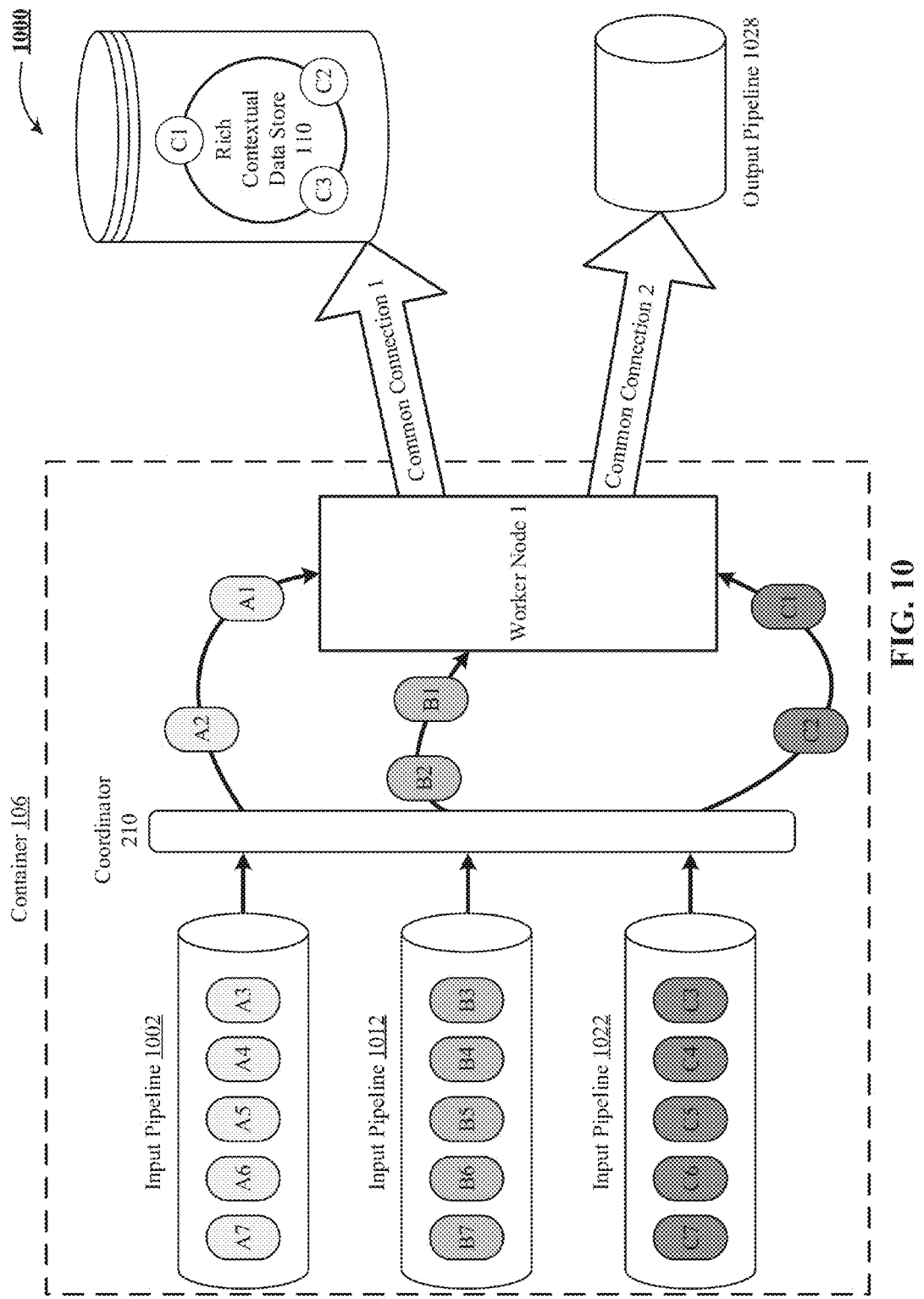
FIG. 10 shows one implementation of concurrent processing of multiple pipelines in a container using common connections to reduce the number of simultaneous connections to the common resources used by the container.

The technology disclosed solves this technical problem by allowing the multiple pipelines in a container to connect to relevant resources using common connections, thereby substantially reducing the number of simultaneous connections to relevant container resources. One implementation of the technical solution is disclosed in FIG. 10, which shows one implementation of concurrent processing 1000 of multiple pipelines 1002, 1012 and 1022 in a container 106 using common connections 1 and 2 to reduce the number of simultaneous connections to the rich contextual data store 110 and output pipeline 1028 used by the container. In FIG. 10, batches belonging to the same pipeline have the same shading and batches from different pipelines have different shading. For instance, batches A1-A7 belong to input pipeline 1002 and have light grey color coding. Batches B1-B7 belong to input pipeline 1012 and have grey color coding. Finally, batches C1-C7 belong to input pipeline 1022 and have dark grey color coding.

In FIG. 10, all three pipelines 1002, 1012 and 1022 and their batches A1-A7, B1-B7 and C1-C7 are processed at the same worker node 1. Consequently, connections to relevant container resources like key-value data in rich contextual data store 110 and output pipeline 1028 are restricted to singletons common connection 1 and common connection 2 respectively, instead of what otherwise could be six connections for the three pipelines 1002, 1012 and 1022, three connections to the key-value data in rich contextual data store 110 and three to the output pipeline 1028.

Flowchart

Figure 11:
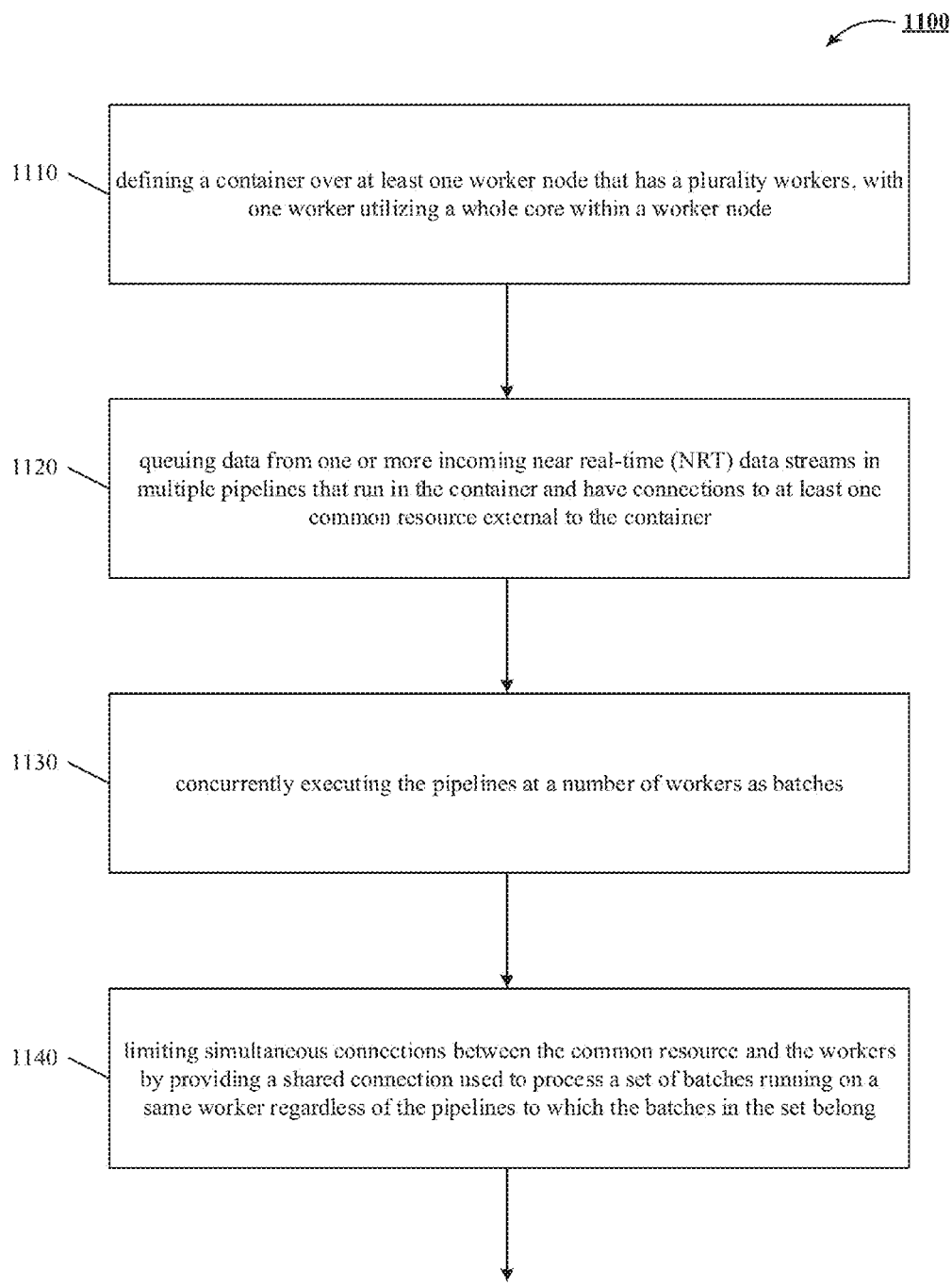
FIG. 11 is a representative method of maintaining throughput of a stream processing framework while increasing processing load.

FIG. 11 shows one implementation of a flowchart 1100 of maintaining throughput of a stream processing framework while increasing processing load. Flowchart 1100 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 11. Multiple actions can be combined in some implementations. For convenience, this workflow is described with reference to the system that carries out a method. The system is not necessarily part of the method.

At action 1110, the method includes defining a container over at least one worker node that has a plurality of workers, with one worker utilizing a whole process or core within a worker node, as described supra.

At action 1120, the method includes queuing data from one or more incoming near real-time (NRT) data streams in multiple pipelines that run in the container and have connections to at least one common resource external to the container, as described supra.

At action 1130, the method includes concurrently executing the pipelines at a number of workers as batches, as described supra.

At action 1140, the method includes limiting simultaneous connections between the common resource and the workers by providing a shared connection used to process a set of batches running on a same worker regardless of the pipelines to which the batches in the set belong, as described supra.

In some implementations of a disclosed method, processed batches from the pipelines are committed to a message bus, including limiting simultaneous connections to the message bus to the number of workers concurrently executing the pipelines such that each worker commits to the message bus using a single connection shared between batches processed at the each worker. For some implementations of this method, the number of workers is 10, further including limiting simultaneous connections to the message bus to 10.

In other implementations, the method can further include limiting concurrent execution of the pipelines to a number of workers and multiplexing the pipelines sequentially over the workers when a number of pipelines exceeds the number of workers. In yet other implementations, the method can also include limiting simultaneous connections to the common resource to the number of workers by providing a shared connection to a set of batches running on a same worker regardless of computation required to process the set.

In some implementations, the disclosed method, wherein the common resource maintains a state, further includes providing a stateless shared connection to the common resource by externalizing information about the state. For this method, the information about the state can be externalized at a key-value column store.

Some Particular Implementations

Some particular implementations and features are described in the following discussion.

In one implementation, described is a method of maintaining throughput of a stream processing framework while increasing processing load. The method includes defining a container over at least one worker node that has a plurality of workers, with one worker utilizing a whole processor core within a worker node, and queuing data from one or more incoming near real-time (NRT) data streams in multiple pipelines that run in the container and have connections to at least one common resource external to the container. The method also includes concurrently executing the pipelines at a number of workers as batches, and limiting simultaneous connections between the common resource and the workers by providing a shared connection to a set of batches running on a same worker regardless of the pipelines to which the batches in the set belong.

In some implementations of a disclosed method, processed batches from the pipelines are committed to a message bus, including limiting simultaneous connections to the message bus to the number of workers concurrently executing the pipelines such that each worker commits to the message bus using a single connection shared between batches processed at the each worker. For some implementations of this method, the number of workers is 10, further including limiting simultaneous connections to the message bus to 10.

In other implementations, the method can further include limiting concurrent execution of the pipelines to a number of workers and multiplexing the pipelines sequentially over the workers when a number of pipelines exceeds the number of workers. In yet other implementations, the method can also include limiting simultaneous connections to the common resource to the number of workers by providing a shared connection to a set of batches running on a same worker regardless of computation required to process the set.

In some implementations of the disclosed method, the common resource external to the container maintains a state which includes providing a stateless shared connection to the common resource by externalizing information about the state. For this method, the information about the state can be externalized at a key-value column store.

Some implementations of the disclosed method include maintaining a stash of connections for each of the workers, wherein the stash includes a configuration component and an instance component. The method further includes receiving a request from a first worker executing a first pipeline to connect to at least one common resource external to the container, wherein the request includes an access key. This method also includes comparing the access key against a configuration component of a corresponding stash of the first worker, and responsive to a match, establishing a first connection between the first worker and the common resource using an instance component of the corresponding stash; and limiting simultaneous connections to the common resource by sharing the first connection across a plurality of pipelines executed by the first worker. The configuration component can include a login and a password.

Other implementations may include a computer implemented system to perform any of the methods described above, the system including a processor, memory coupled to the processor, and computer instructions loaded into the memory.

Yet another implementation may include a tangible computer readable storage medium impressed with computer program instructions; the instructions, when executed on a processor cause a computer to implement any of the methods described above.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as terminology, introduction, IoT platform and stream-batch processing framework, state machine, data columnar, flowcharts, multi-tenant integration, some particular implementations, etc.

A batch is defined on a time-slice basis and includes a portion of at least one incoming NRT data stream most recently received within a time window, for some implementations. In others, a batch is defined on a batch-size basis and includes a data size constrained portion of at least one incoming NRT data stream received most recently.

In one implementation, a method of managing resource allocation to task sequences that have long tails includes operating a computing grid that includes machine resources, with heterogeneous containers defined over whole machines and some containers including multiple machines. The method includes initially allocating multiple machines to a first container, initially allocating first set of stateful task sequences to the first container, running the first set of stateful task sequences as multiplexed units of work in the first container under control of a container-scheduler, where each unit of work for a first task sequence runs to completion on first machine resources in the first container, unless it overruns a time-out, before a next unit of work for a second task sequence runs multiplexed on the first machine resources. The method further includes detecting that at least one long tail task sequence is consuming measurably fewer resources than initially allocated, and responsive to the detecting, automatically allocating one or more additional stateful task sequences to the first container or deallocating one or more machines from the first container.

The disclosed method of managing resource allocation to task sequences that have long tails can also include detecting that excess machine resources are dedicated to the first set of task sequences, scheduling the first set of task sequences over a first subset of machines in the first container to leave a second subset of machines in the first container unused, and automatically deallocating the second subset of machines from the first container.

In one implementation, the disclosed method further includes detecting that excess machine resources are dedicated to the first set of task sequences, and automatically allocating additional stateful task sequences to the first container. The disclosed method can include a number of task sequences running in the first container increasing from 4 to 20.

In some implementations, a disclosed method of managing resource allocation to surging task sequences includes operating a computing grid that includes machine resources, with heterogeneous containers defined over whole machines and some containers including multiple machines. The method includes initially allocating multiple machines to a first container, initially allocating first set of stateful task sequences to the first container, and running the first set of stateful task sequences as multiplexed units of work in the first container under control of a container-scheduler, where each unit of work for a first task sequence runs to completion on first machine resources in the first container, unless it overruns a time-out, before a next unit of work for a second task sequence runs multiplexed on the first machine resources. The method further includes detecting that at least one task sequence is requiring measurably more resources than initially allocated, determining that the multiple machines allocated to the first container have not yet reached a predetermined maximum, and automatically allocating more machines to the first container or reallocating some task sequences in the first set of task sequences from the first container to a second container. The disclosed method can further include detecting latency exceeding a predetermined threshold in running the first set of tasks sequences in the first container, automatically allocating additional machines to the first container, and scheduling units of work for the first set of task sequences over the multiple machines and the additional machines in the first container. The number of machines in the first container can increase from 8 to 10. The disclosed method can also include detecting latency exceeding a predetermined threshold in running the first set of tasks sequences in the first container, and determining that the multiple machines allocated to the first container have reached a predetermined maximum and that no more machines will be allocated to the first set of task sequences.

The disclosed method of managing resource allocation to surging task sequences can also include, during running, persisting state information of the first set of task sequences, detecting latency exceeding a predetermined threshold in running the first set of tasks sequences in the first container, and automatically reallocating a second subset of task sequences from the first container to a second container, while leaving a first subset of task sequences allocated to the first container. The method further includes using the persisted state information to initialize the second subset of task sequences in the second container, and scheduling units of work for the first subset of task sequences in the first container and the second subset of task sequences in the second container.

In one implementation, a method of managing resource allocation to faulty task sequences includes initially allocating a first set of stateful task sequences to a first container, receiving input from a replayable input source and triggering stateful first set of tasks sequences to process the input, and running the first set of stateful task sequences as multiplexed units of work in the first container under control of a container-scheduler, where each unit of work for a first task sequence runs to completion on first machine resources in the first container, unless it overruns a time-out, before a next unit of work for a second task sequence runs multiplexed on the first machine resources. The method further includes, during running, persisting state information of the first set of task sequences, detecting runtime of a unit of work in a faulty task sequence exceeding a predetermined timeout threshold, and restarting the faulty task sequence by automatically reloading persisted state information of the faulty task sequence. This method also includes automatically rewinding a replayable input to the faulty task sequence to a point preceding the detecting and synchronized with the persisted state information for the faulty task sequence, and rerunning the faulty task sequence to completion of the unit of work without exceeding the predetermined timeout threshold.

The disclosed method of managing resource allocation to faulty task sequences further includes reallocating the faulty task sequence from the first container to a second container, restarting the faulty task sequence at the second container by reloading persisted state information of the faulty task sequence at the second container, rewinding a replayable input to the faulty task sequence at the second container to a point preceding the detecting and synchronized with the persisted state information for the faulty task sequence, and rerunning the faulty task sequence to completion of the unit of work without exceeding the predetermined timeout threshold.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

What is claimed is:

1. A method of maintaining throughput of a stream processing framework while increasing processing load, the method including:
    defining a container over at least one worker node that has a plurality of workers, with one worker utilizing a whole processor core within a worker node;
    queuing data from one or more incoming data streams into multiple pipelines that run in the container and have connections to at least one common resource external to the container;
    concurrently executing the pipelines at a number of workers as batches; and
    limiting simultaneous connections between the common resource and the workers by providing a shared connection used to process a set of batches running on a same worker regardless of the pipelines to which the batches in the set belong.

2. The method of claim 1, wherein processed batches from the pipelines are committed to a message bus, further including:
    limiting simultaneous connections to the message bus to the number of workers concurrently executing the pipelines such that each worker commits to the message bus using a single connection shared between batches processed at each worker.

3. The method of claim 2, wherein the number of workers is 10, further including limiting simultaneous connections to the message bus to 10.

4. The method of claim 1, further including:
    limiting concurrent execution of the pipelines to a number of workers and multiplexing the pipelines sequentially over the workers when a number of pipelines exceeds the number of the workers.

5. The method of claim 1, further including:
    limiting simultaneous connections to the common resource to the number of workers by providing a shared connection to a set of batches running on a same worker regardless of computation required to process the set.

6. The method of claim 1, wherein the common resource maintains a state, further including:
    providing a stateless shared connection to the common resource by externalizing information about the state.

7. The method of claim 6, wherein the information about the state is externalized at a key-value column store.

8. The method of claim 1, further including:
    maintaining a stash of connections for each of the workers, wherein the stash includes a configuration component and an instance component;
    receiving a request from a first worker executing a first pipeline to connect to at least one common resource external to the container, wherein the request includes an access key;
    comparing the access key against a configuration component of a corresponding stash of the first worker;
    responsive to a match, establishing a first connection between the first worker and the common resource using an instance component of the corresponding stash; and
    limiting simultaneous connections to the common resource by sharing the first connection across a plurality of pipelines executed by the first worker.

9. The method of claim 8, wherein the configuration component includes a login and a password.

10. A system including one or more processors coupled to memory, the memory loaded with computer instructions to maintain throughput of a stream processing framework while increasing processing load, the instructions, when executed on the processors, implement actions comprising:
    defining a container over at least one worker node that has a plurality of workers, with one worker utilizing a whole processor core within a worker node;
    queuing data from one or more incoming data streams into multiple pipelines that run in the container and have connections to at least one common resource external to the container;
    concurrently executing the pipelines at a number of workers as batches; and
    limiting simultaneous connections between the common resource and the workers by providing a shared connection used to process a set of batches running on a same worker regardless of the pipelines to which the batches in the set belong.

11. The system of claim 10, wherein processed batches from the pipelines are committed to a message bus, further implementing actions comprising:
    limiting simultaneous connections to the message bus to the number of workers concurrently executing the pipelines such that each worker commits to the message bus using a single connection shared between batches processed at each worker.

12. The system of claim 11, wherein the number of workers is 10, further implementing actions comprising limiting simultaneous connections to the message bus to 10.

13. The system of claim 10, further implementing actions comprising:
    limiting concurrent execution of the pipelines to a number of workers and multiplexing the pipelines sequentially over the workers when a number of pipelines exceeds the number of the workers.

14. The system of claim 10, further implementing actions comprising:
    limiting simultaneous connections to the common resource to the number of workers by providing a shared connection to a set of batches running on a same worker regardless of computation required to process the set.

15. The system of claim 10, further implementing actions comprising:
   maintaining a stash of connections for each of the workers, wherein the stash includes a configuration component and an instance component;
   receiving a request from a first worker executing a first pipeline to connect to at least one common resource external to the container, wherein the request includes an access key;
   comparing the access key against a configuration component of a corresponding stash of the first worker;
   responsive to a match, establishing a first connection between the first worker and the common resource using an instance component of the corresponding stash; and
   limiting simultaneous connections to the common resource by sharing the first connection across a plurality of pipelines executed by the first worker.

16. The system of claim 15, wherein the configuration component includes a login and a password.

17. A non-transitory computer readable storage medium impressed with computer program instructions to maintain throughput of a stream processing framework while increasing processing load, the instructions, when executed on a processor, implement a method comprising:
   defining a container over at least one worker node that has a plurality of workers, with one worker utilizing a whole processor core within a worker node;
   queuing data from one or more incoming data streams into multiple pipelines that run in the container and have connections to at least one common resource external to the container;
   concurrently executing the pipelines at a number of workers as batches; and
   limiting simultaneous connections between the common resource and the workers by providing a shared connection used to process a set of batches running on a same worker regardless of the pipelines to which the batches in the set belong.

18. The non-transitory computer readable storage medium of claim 17, wherein processed batches from the pipelines are committed to a message bus, implementing the method further comprising:
   limiting simultaneous connections to the message bus to the number of workers concurrently executing the pipelines such that each worker commits to the message bus using a single connection shared between batches processed at each worker.

19. The non-transitory computer readable storage medium of claim 18, wherein the number of workers is 10, implementing the method further comprising limiting simultaneous connections to the message bus to 10.

20. The non-transitory computer readable storage medium of claim 17, implementing the method further comprising:
   maintaining a stash of connections for each of the workers, wherein the stash includes a configuration component and an instance component;
   receiving a request from a first worker executing a first pipeline to connect to at least one common resource external to the container, wherein the request includes an access key;
   comparing the access key against a configuration component of a corresponding stash of the first worker;
   responsive to a match, establishing a first connection between the first worker and the common resource using an instance component of the corresponding stash; and
   limiting simultaneous connections to the common resource by sharing the first connection across a plurality of pipelines executed by the first worker.

* * * * *